US007576959B2

(12) United States Patent
Huang et al.

(10) Patent No.: US 7,576,959 B2
(45) Date of Patent: Aug. 18, 2009

(54) CIRCUIT INTERRUPTING DEVICE WITH AUTOMATIC END-OF-LIFE TEST

(75) Inventors: Huadao Huang, No. 58 Shahe Road Jiangqiao Town. Jiading Borough, Shanghai (CN); Huayang Lu, Shanghai (CN)

(73) Assignee: Huadao Huang, Shanghai (CN)

( * ) Notice: Subject to any disclaimer, the term of this patent is extended or adjusted under 35 U.S.C. 154(b) by 99 days.

(21) Appl. No.: 11/790,376

(22) Filed: Apr. 25, 2007

(65) Prior Publication Data

US 2008/0170341 A1 Jul. 17, 2008

(30) Foreign Application Priority Data

Jan. 17, 2007 (CN) .................... 2007 2 0103255 U

(51) Int. Cl.
*H02H 3/14* (2006.01)

(52) U.S. Cl. .......................................... 361/42; 361/44

(58) Field of Classification Search .............. 361/42–50
See application file for complete search history.

(56) References Cited

U.S. PATENT DOCUMENTS

| | | | |
|---|---|---|---|
| 4,386,338 | A | 5/1983 | Doyle et al. |
| 4,518,945 | A | 5/1985 | Doyle et al. |
| 4,595,894 | A | 6/1986 | Doyle et al. |
| 5,202,662 | A | 4/1993 | Bienwald et al. |
| 5,654,857 | A | 8/1997 | Gershen |
| 5,680,287 | A | 10/1997 | Gernhard et al. |
| 5,963,408 | A | 10/1999 | Neiger et al. |
| 6,040,967 | A | 3/2000 | DiSalvo |
| 6,052,265 | A | 4/2000 | Zaretsky et al. |
| 6,111,733 | A | 8/2000 | Neiger et al. |
| 6,226,161 | B1 | 5/2001 | Neiger et al. |
| 6,246,558 | B1 | 6/2001 | DiSalvo et al. |
| 6,252,407 | B1 | 6/2001 | Gershen |
| 6,282,070 | B1 | 8/2001 | Ziegler et al. |
| 6,288,882 | B1 | 9/2001 | DiSalvo et al. |
| 6,309,248 | B1 | 10/2001 | King |
| 6,381,112 | B1 | 4/2002 | DiSalvo |
| 6,437,953 | B2 | 8/2002 | DiSalvo et al. |
| 6,469,881 | B2 | 10/2002 | Gershen et al. |
| 6,580,344 | B2 | 6/2003 | Li |
| 6,671,145 | B2 | 12/2003 | Germain et al. |
| 6,864,766 | B2 | 3/2005 | DiSalvo et al. |

(Continued)

*Primary Examiner*—Danny Nguyen
(74) *Attorney, Agent, or Firm*—Fei-Fei Chao; Andrews Kurth, LLP

(57) ABSTRACT

The present invention provides a novel circuit interrupting device capable of performing an automatic end-of-life test using a status test switch (KR-1), when the device is properly wired and the reset button is at a tripped state. The present invention is further characterized by its novel reset mechanism using a reset start switch (KR-4), a novel electrical connection between an input power end, an output power end, and a user accessible end to establish or discontinue electricity in the circuit interrupting device, and a novel test mechanism which uses a test button in connection with a rotatable lever to provide a dual test function to either test the components of the circuit interrupting device when the power is on and the reset button is at a reset state, or provide a mechanical trip when the reset button cannot be tripped by artificially generating an electric leakage current. Finally, the present invention provides a method to monitor the end-of-life of the device.

21 Claims, 16 Drawing Sheets

U.S. PATENT DOCUMENTS 6,963,260 B2 11/2005 Germain et al.
7,019,952 B2 3/2006 Huang et al.
7,049,910 B2 5/2006 Campolo et al.
7,049,911 B2 5/2006 Germain et al.
7,164,564 B1 * 1/2007 Finlay et al. .................. 361/42

* cited by examiner

CIRCUIT INTERRUPTING DEVICE WITH AUTOMATIC END-OF-LIFE TEST

RELATED APPLICATION

This patent application claims the priority of Chinese Patent Application No. 200720103255.6, filed on Jan. 17, 2007, which is herein incorporated by reference.

FIELD OF THE INVENTION

The present invention relates to a novel circuit interrupting device which is capable of performing an automatic end-of-life test due to a status test switch (KR-1), when the device is properly wired and the reset button is at a tripped state. The present invention is further characterized by a novel reset mechanism having a reset start switch (KR-4), which comprises a spring piece, a conductive pin, and a 7-shaped metal piece. Additionally, the present invention contains a novel electrical connection between an input power end, an output power end, and a user accessible end to establish or discontinue electricity. Furthermore, the present invention relates to a novel test mechanism which uses a test button in connection with a rotatable lever to provide a dual functioned test button to either test the components of the circuit interrupting device when the power is on and the reset button is at a reset state, or provide a mechanical trip when the power is on and pressing the test button to the first level cannot trip the circuit interrupting device. Finally, the present invention relates to a method to monitor the end-of-life of the device.

BACKGROUND OF THE INVENTION

Circuit interrupting devices, such as ground fault circuit interrupters (GFCIs), arc fault circuit interrupters (AFCIs), and circuit breakers, have been widely used by consumers since 1970s. Nowadays, due to household safety concerns, there are needs for GFCIs with extra safety features. According to new UL standards under 943A which was implemented on Jul. 28, 2006, a GFCI is required not only to have reverse wiring protection, but also to be able to provide a user with indications when the GFCI has reached the end of its service life and is no longer capable of providing ground fault protection, and cutoff electricity on the user accessible plug of the GFCI. That is because for most of the GFCIs currently available on the market, when their service life ends, resetting by pressing the reset button is still possible, which gives the users a false sense of security that they are still under proper protection of the GFCI, while in fact the GFCIs' capability of sensing a ground fault and cutting off the electricity due to a ground fault has been compromised. Thus, when a ground fault occurs, the GFCI is unable to provide any protection, which can result in fatal electric shocks. Additionally, current GFCIs do not have the capability to prevent reverse wiring errors.

SUMMARY OF THE INVENTION

One objective of the present invention is to provide a fully functioned circuit interrupting device, which is capable of performing an automatic end-of-life test using a status test switch (KR-1) to determine whether the essential components of the circuit interrupting device are functioned properly. This automatic end-of-life test occurs when the circuit interrupting device is properly powered and the reset button of the circuit interrupting device is at a tripped position.

The KR-1 comprises a fixed contact point adapted to electrically connect to a neutral wire of the input power line, and a flexible metal piece adapted to electrically connect to a hot wire of the input power line through a resistor and a solenoid coil which, when the circuit interrupting device is powered, generates a simulated fault to test said components of said circuit interrupting device.

The KR-1 is further characterized for its not physically contacting with the reset button.

When all of the essential components of the circuit interrupting device are functioned properly, said circuit interrupting device can be reset. When at least one of the components of the circuit interrupting device is not functioned properly, the circuit interrupting device cannot be reset.

The circuit interrupting device can be a ground fault circuit interrupter, an arc fault circuit interrupter, an immersion detection circuit interrupter, an appliance leakage circuit interrupter, or a circuit breaker.

The essential components of the circuit interrupting device include, but are not limited to, a differential transformer (DT), an integrated circuit (IC), a silicon controlled rectifier (SCR), and a solenoid coil (SOL).

The preferred IC is an LM1851 or an RV4145.

The circuit interrupting device further comprises a reset indicator light adapted to electrically connect between the positive pole of a silicon controlled rectifier (SCR) and a solenoid coil. The reset indicator light is on when all of the components of the circuit interrupting device are functioned properly; the reset indicator light is off when at least one of the components of the circuit interrupting device is not functioned properly.

The circuit interrupting device further comprises an output indicator light connected between a hot wire and a neutral wire of the output power end. When there is electricity flowing between the hot wire and the neutral wire of the output power end, the output indicator light is turned on.

Another objective of the present invention is to provide a circuit interrupting device which contains a reset start switch (KR-4) comprising a spring piece, a conductive pin, and a 7-shaped metal piece. The KR-4 is located below a tripper of the circuit interrupting device.

The spring piece has a fixed end and a cantilever end. The fixed end of the spring piece is soldered to a printed circuit board. The cantilever end of the spring piece is located right above the conductive pin. The spring piece is adapted to be electrically connected to the hot wire of the input power line through a solenoid coil.

The 7-shaped metal piece has a top portion and a bottom portion. The top portion of the 7-shaped piece is above the cantilever end of the spring piece and the bottom portion being soldered on the printed circuit board.

The 7-shaped metal piece and the conductive pin are connected to ground through a silicon controlled rectifier (SCR). When the circuit interrupting device is properly wired, a depression of the reset button turns on the KR-4, which allows the cantilever end of the spring piece to be in contact with the conductive pin to allow reset; and when the circuit interrupting device is in a reset position, the cantilever end of the spring piece disconnects with the conductive pin and is in contact with the top portion of the 7-shaped metal piece.

When the circuit interrupting device is reset, the KR-1 is turned off.

In yet another objective of the present invention, the circuit interrupting device comprises a housing; a tripping device positioned in a base of the housing; a printed circuit board positioned in the base of the housing. The printed circuit board comprises: (1) a pair of power input metal pieces having a first end and a second end; the first end of each of said pair of power input metal pieces passes through a differential transformer to be soldered to the printed circuit board and is operationally connected to the hot wire or the neutral wire of the input power line, respectively; the second end of each of the second pair of power input metal pieces has a fixed contact; (2) a pair of flexible power output metal pieces each comprising a pair of cantilevers; each end of the pair of cantilevers has a movable contact; each of the pair of flexible power output metal pieces is operationally connected to a hot wire or a neutral wire of the output power line, respectively; and (3) a pair of power output conductors each having two ends; each end of each pair of power output conductors is connect to a hot wire outlet or a neutral wire outlet on the user accessible output end by a pair of gripping wing pieces, respectively; each of the power output conductors contains a fixed contact.

The fixed contact on each of the pair of power input metal pieces is capable of contacting with one of the movable contact on one of the pair of cantilevers of each of the pair of flexible power output metal pieces; and the fixed contact on each of the pair of power output conductors is capable of contacting with the other movable contact on one of the pair of cantilevers of each of flexible power output metal pieces to establish or disconnect electrical continuity between the input power end and the output power end and the user accessible output ends.

The tripping device comprises a tripper which contains an aperture to receive a directional lock extended from the reset button; a reset start switch (KR-4) which locates beneath the tripper and, when turned on, allows reset; a locking device having a locking spring and containing a first through hole and a second through hole; the first through hole is capable of aligning with the aperture of the tripper to receive the directional lock; the locking device threads through the tripper; and a solenoid coil (SOL) having a plunger; when the SOL is energized, the plunger plunges onto a side wall of the locking device causing the first through hole to align with the aperture of the tripper to reset or trip the circuit interrupting device.

The tripper has a pair of arms extended from a left side and a right side of the tripper; the pair of cantilevers of the flexible power output metal pieces is rested on said pair of arms of said tripper.

The directional lock of the reset button has a blunt end and a groove above the blunt end. The directional lock is capable of penetrating the aperture of the tripper and the first through hole of the locking device when the first through hole of the locking device is aligned with the aperture of the tripper to reset or trip the circuit interrupting device.

The KR-1 is located beneath a plastic column, which is located underneath one of the pair of flexible power output metal pieces; when the reset button is at the tripped state, the pair of flexible power output metal pieces is at a downward position which pushes the flexible metal piece of the KR-1 to be in contact with the fixed contact point of the KR-1 to automatically turn on the end-of-life test. When the reset button is at a reset position, the pair of flexible power output metal pieces is at an upward position which separates the flexible metal piece of the KR-1 from the fixed contact point of the KR-1 to discontinue the end-of-life test.

The second through hole of the locking device receives an upward inclined handle of a rotatable lever which can pull the locking device to make the first through hole of the locking device align with the aperture of the tripper. The rotable lever comprises the upward inclined handle, a lever axis, and a v-shaped slot. The v-shaped slot is capable of receiving the end of an arm extended from a test button.

There is a pair of metal pieces situated along a side of the rotatable lever. The pair of metal pieces does not contact with each other when the rotatable lever is not rotated. But when the rotatable lever is rotated downward, the side of the rotatable lever pushes the pair of metal pieces to be in contact with each other.

The test button has a first level and a second level depression. When the test button is depressed at the first level, the end of the extended arm of the test button pushes the v-shaped slot of the rotatable lever to cause the rotatable lever to rotate around the lever axis and thereby pushes the pair of metal pieces to be in contact with each other, thereby simulated a fault to test the components of the circuit interrupting device.

When the depression of the test button does not cause a simulation of a fault to trip the circuit interrupting device, a further depression of the test button at the second level causes the circuit interrupting device to be mechanically tripped.

When wires are erroneously connected, the circuit interrupting device automatically prevents the generation of a simulated leakage current, thereby the silicon controlled rectifier (SCR) cannot be turned on and no electric current flows through the solenoid coil. The mechanical tripping device cannot move and the reset button cannot be reset. The reset indicator is off, indicating a wiring error.

Finally, the present invention provides a method for testing the components of a ground fault circuit interrupter (GFCI). The method includes properly connecting the input power line and the output power line of the GFCI when the reset button of the GFCI is at a tripped position; and monitoring a showing up of a reset indicator light. When the reset indicator light is lit, the components of the GFCI are functioned properly. When the reset button of said GFCI is not at a tripped position, one should depress a test button at a first level to allow a test of the components of the GFCI and monitor the reset indicator light to be lit.

BRIEF DESCRIPTION OF THE DRAWINGS

The detailed description will refer to the following drawings in which like numerals refer to like elements, and in which:

FIG. 5-B is a partial cross-sectional view along the A-A line in FIG. 3, illustrating the GFCI when the reset button is reset and the GFCI is in a normal state;

FIG. 6-B is a partial cross-sectional view along the B-B line in FIG. 3, illustrating the GFCI the instant the reset button is pressed;

FIG. 6-C is a partial cross-sectional view along the B-B line in FIG. 3, illustrating the GFCI when the reset button is reset and the GFCI is in a normal state;

FIG. 7-B is a partial cross-sectional view along the C-C line in FIG. 3, illustrating the GFCI the instant the test button is pressed;

FIG. 7-C is a partial cross-sectional view along the C-C line in FIG. 3. illustrating the GFCI when the test button is pressed and the GFCI is tripped with no power output;

FIG. 7-D is a partial cross-sectional view along the C-C line in FIG. 3, illustrating the GFCI when the test button is continually pressed to forcibly release the GFCI and to cut off the power output of the GFCI;

FIG. 9-B is a wiring diagram of another exemplary internal circuit of the leakage detection control chip (e.g., IC RV4145).

DETAILED DESCRIPTION OF THE INVENTION

The present invention describes a circuit interrupting device, which includes, but is not limited to, a ground fault circuit interrupter (GFCI), an arc fault circuit interrupter (AFCI), an immersion detection circuit interrupter, an appliance leakage circuit interrupter, or a circuit breaker. The preferred circuit interrupting device is a GFCI.

The following experimental designs and result are illustrative, but not limiting the scope of the present invention. Reasonable variations, such as those occur to reasonable artisan, can be made herein without departing from the scope of the present invention. For example, while an exemplary GFCI is illustrated and described with respect to the Figures, one skilled in the art will appreciate that the description equally applies to other circuit interrupting devices. Also, in describing the invention, specific terminology is employed for the sake of clarity. However, the invention is not intended to be limited to the specific terminology so selected. It is to be understood that each specific element includes all technical equivalents which operate in a similar manner to accomplish a similar purpose.

Figure 1:
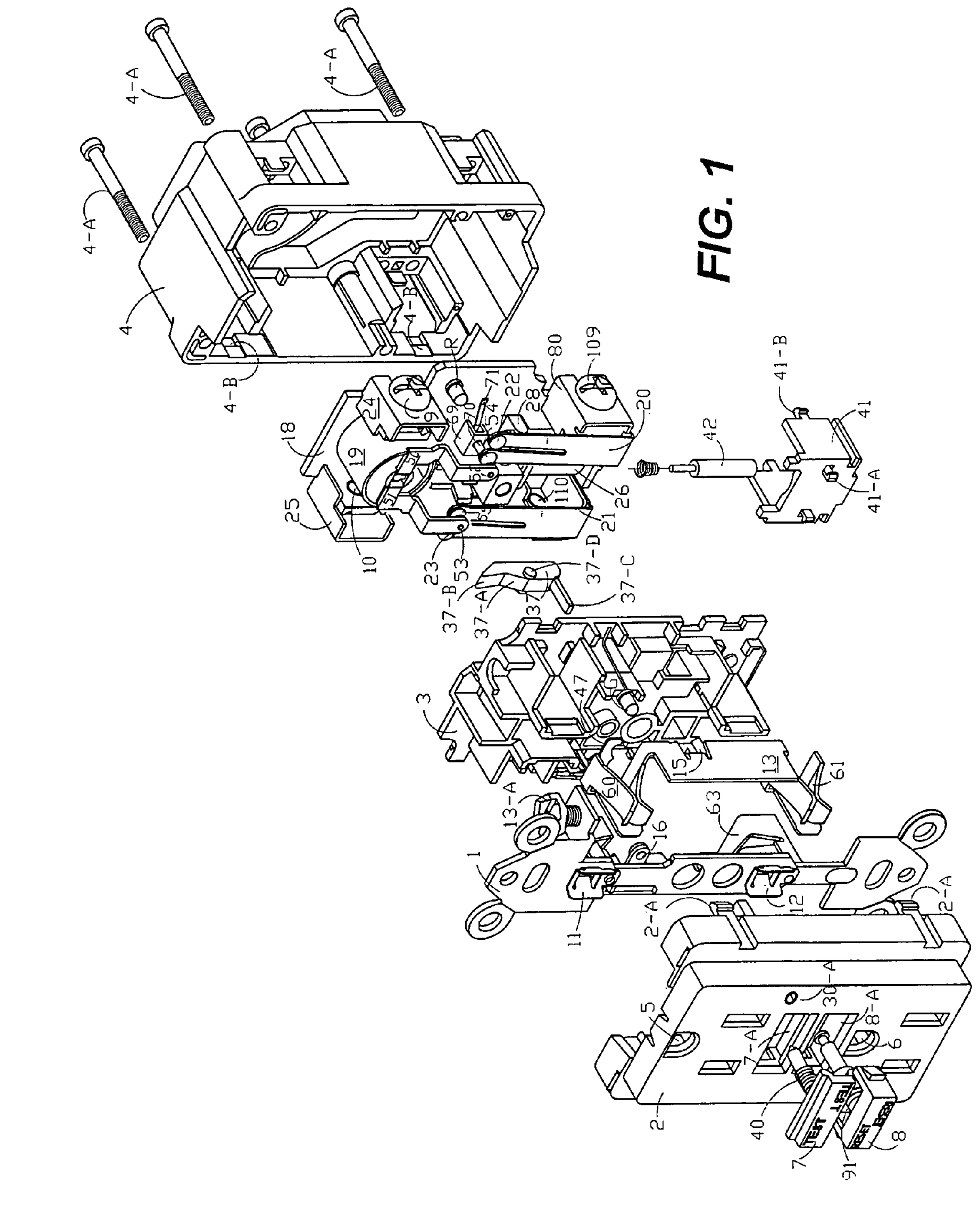
FIG. 1 is an exploded view illustrating the structure of an exemplary ground fault circuit interrupter (GFCI) with automatic end-of-life test.
Figure 2:
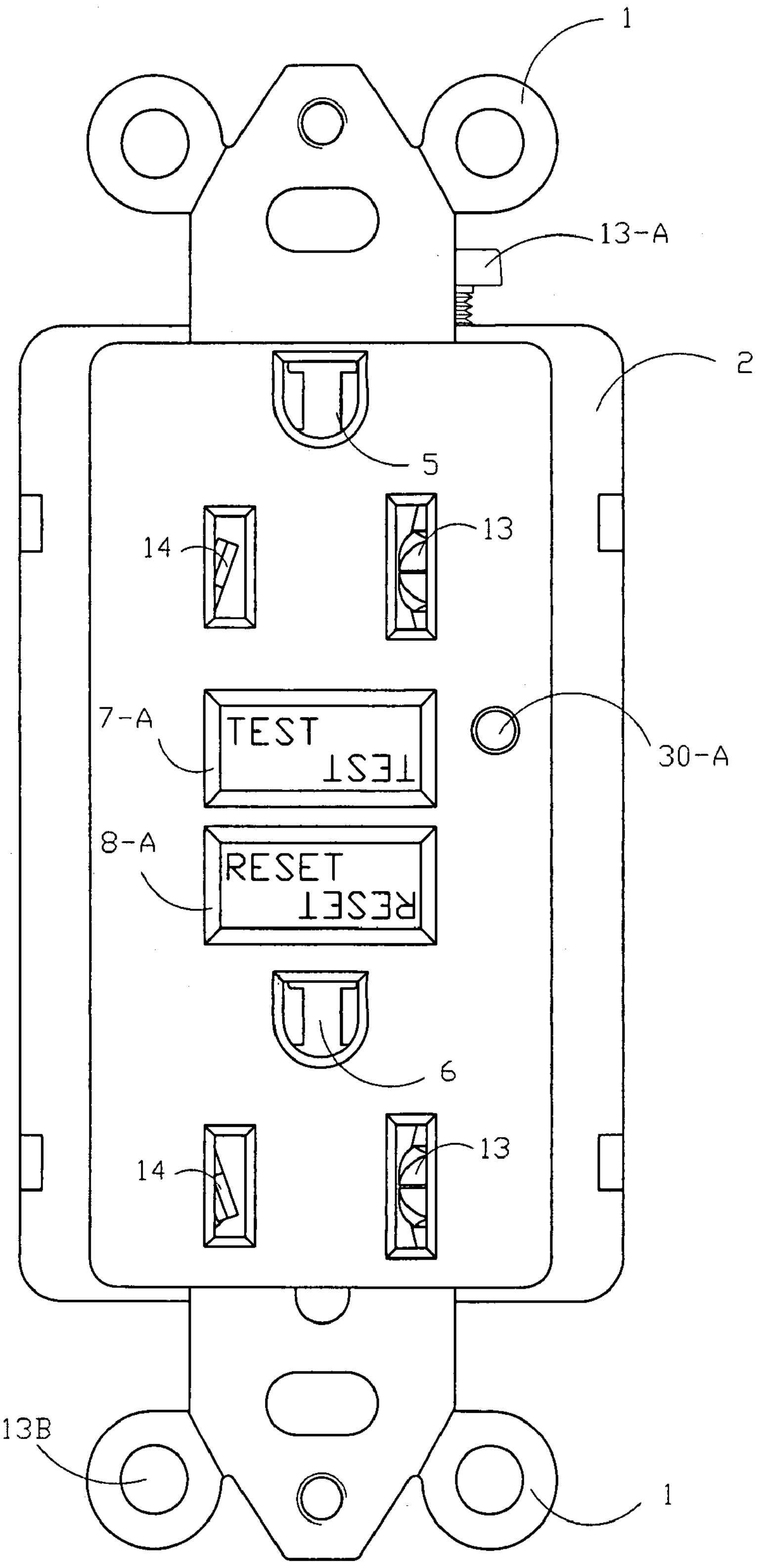
FIG. 2 is the front view of the exemplary GFCI of FIG. 1.
Figure 3:
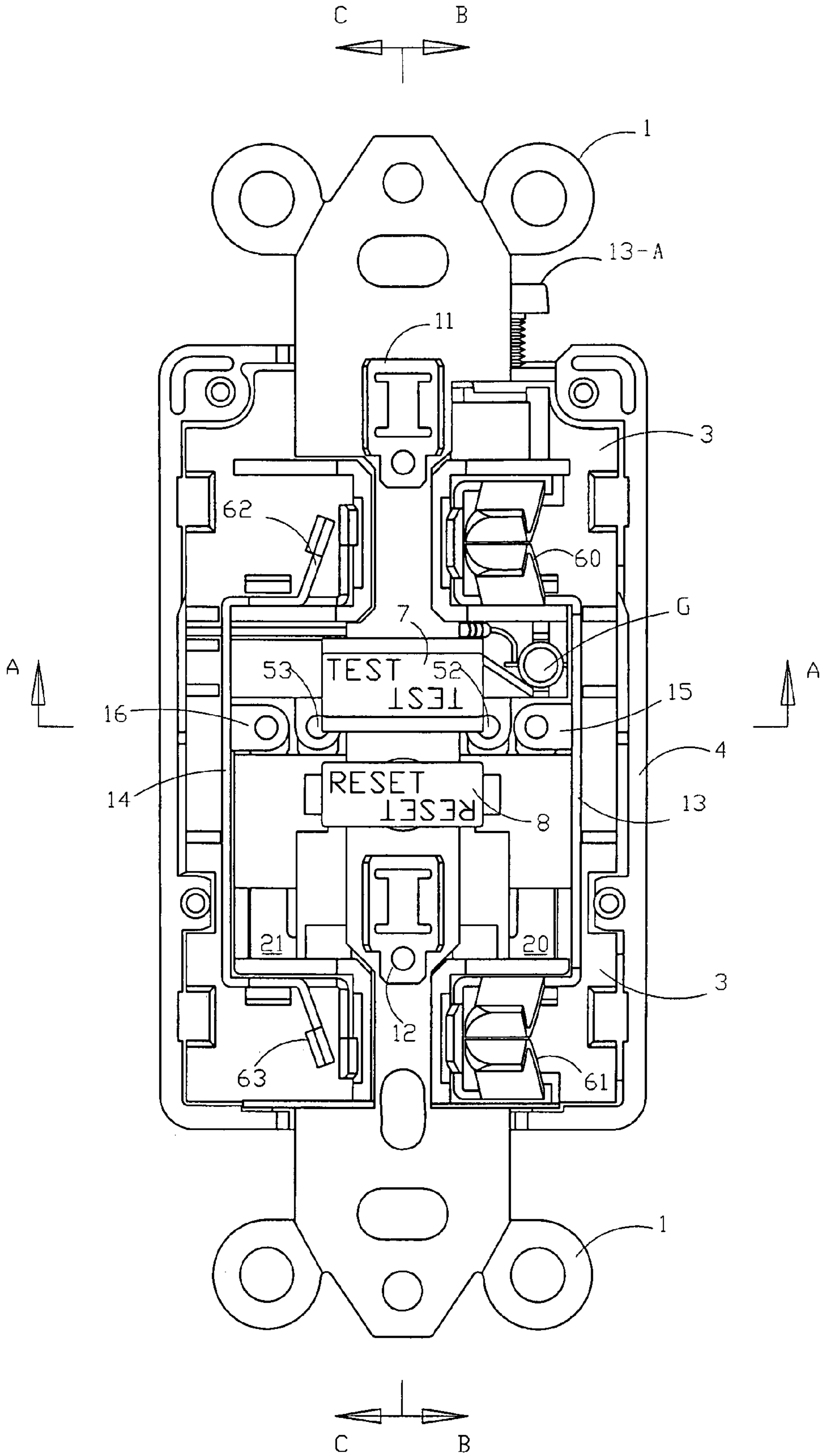
FIG. 3 is the front view of the exemplary GFCI of FIG. 1 with the upper cover removed.

FIG. 1 illustrates an exemplary circuit interrupting device, e.g., a GFCI, with automatic end-of-life test. FIG. 2 is the front view of the exemplary GFCI of FIG. 1. FIG. 3 is the front view of the exemplary GFCI of FIG. 1 with the upper cover removed.

As shown in FIG. 1, the GFCI includes a housing. The housing of the GFCI includes a front lid 2, an insulated mid-level support 3, and a base 4. A metal mounting strap 1 is installed between the front lid 2 and the insulated mid-level support 3. The printed circuit board 18 is installed between the insulated mid-level support 3 and the base 4.

As shown in FIG. 1 and FIG. 2, power output sockets 5, 6, a reset button hole 8-A, a test button hole 7-A, and a status indicating light hole 30-A are located on the front lid 2. A reset button ("RESET") 8 and a test button ("TEST") 7 are installed in the reset button hole 8-A and the test button hole 7-A, respectively. The reset button 8 and the test button 7 penetrate through the metal mounting strap 1 and the insulated mid-level support 3 to make contact with the components on the printed circuit board 18. Four clamp hooks 2-A are located on the side of the front lid 2 to be used for fastening a groove 4-B on the base 4.

The metal mounting strap 1 is grounded through a grounding screw 13-A (as shown in FIGS. 1-2) and wires. Grounding pieces 11, 12 are arranged on the metal mounting strap 1 at places corresponding to the grounding holes of the power output sockets 5, 6 of the front lid 2. Installation holes 13B are placed on both sides of the metal mounting strap 1.

As shown in FIGS. 1 and 3, a hot power output conductor 14 and a neutral power output conductor 13 are installed on the two sides of the insulated mid-level support 3. At the two ends of the power power output conductors 13, 14, gripping wing pieces 60, 61, 62, 63 are arranged at the places corresponding to the hot and neutral holes of the power output sockets 5, 6 on the front lid 2. Fixed contacts 15 and 16 are arranged on the power output conductors 13 and 14.

As shown in FIG. 1, the base 4 is used to accommodate the insulated mid-level support 3 and the printed circuit board 18. A pair of hot and neutral power input wiring screws 9, 10 and a pair of hot and neutral power output wiring screws 109, 110 are installed symmetrically on the two sides of the base 4.

The printed circuit board 18, which is installed inside the housing, is capable of supplying power to or cutting off power from the power output sockets 5, 6 of the front lid 2 and the power output wiring screws 109, 110. The printed circuit board 18 is the central piece of the present invention, it contains switches and devices which are capable of testing, upon power on, whether the GFCI has come to the end of its life, displaying the result of the test, and providing mechanical means to forcibly trip the GFCI, and preventing any reverse wiring errors by disallowing the GFCI to reset.

Figure 4:
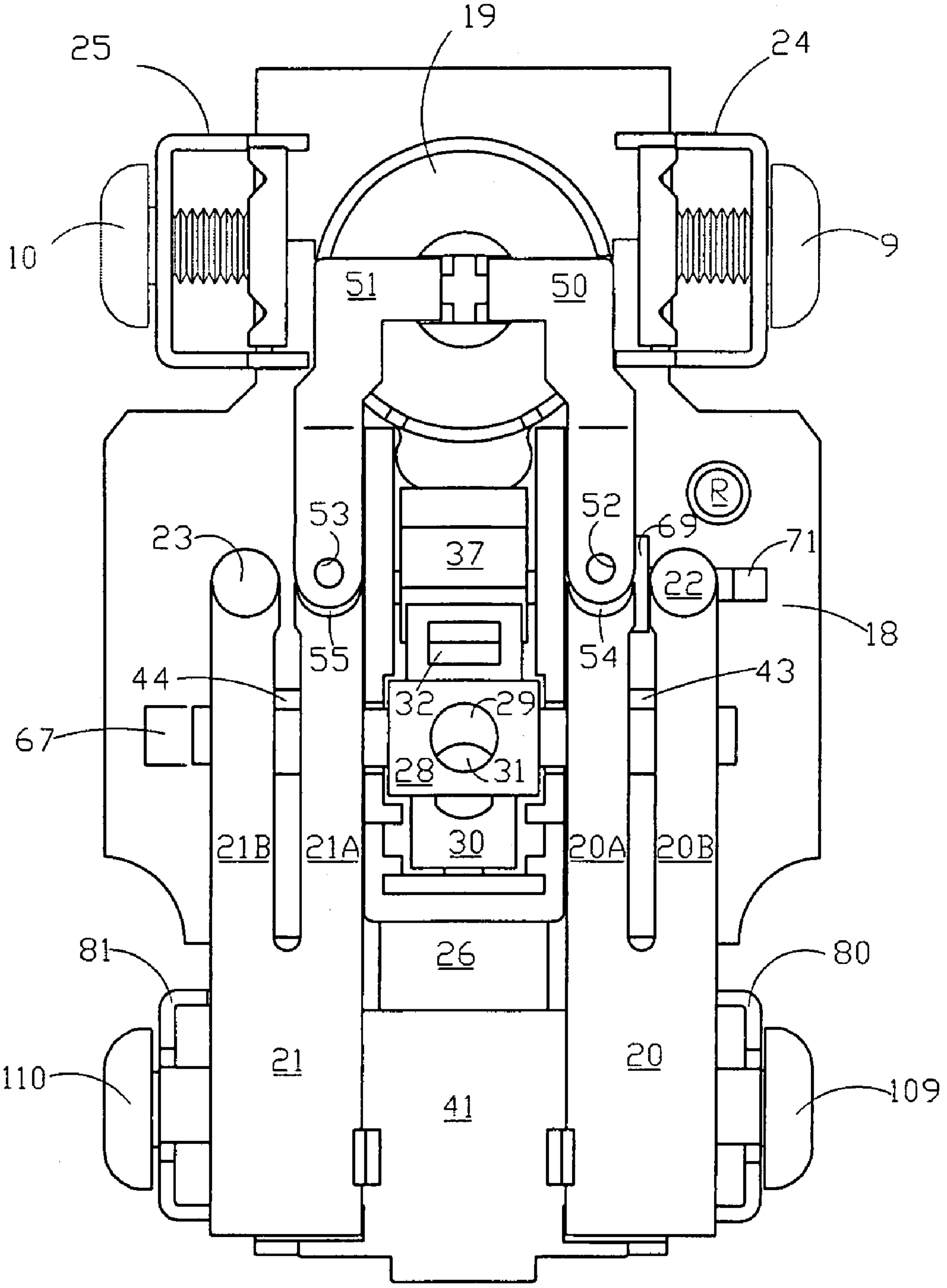
FIG. 4 illustrates exemplary relationships among the components of the printed circuit board of the exemplary GFCI of FIG. 1.

FIG. 4 illustrates exemplary relationships among the components of the printed circuit board 18. As shown in FIG. 1 and FIG. 4, an "L" shaped neutral power input metal piece 50 and an "L" shaped hot power input metal piece 51 are located on the printed circuit board 18. One end of the neutral power input metal piece 50 is bent 90 degrees downwards and penetrates through a differential transformer 19. This end of the neutral power input metal piece 50 is soldered onto the printed circuit board 18 and connected to the neutral power input wiring screw 9 through an input wiring piece 24. Similarly, one end of the hot power input metal piece 51 is also bent 90 degrees downwards and penetrates through the differential transformer 19. This end of the hot power input metal piece 51 is soldered onto the printed circuit board 18 and connected to the hot power input wiring screw 10 through an input wiring piece 25. The neutral power input wiring screw 9 is connected to a neutral wire inside a wall through a conductive wire. The hot power input wiring screw 10 is connected to a hot wire inside the wall through a conductive wire. Fixed contacts 52, 53 are arranged on the other end of the "L" shaped power input metal pieces 50, 51.

Two flexible output metal pieces 20, 21 are located above and on the sides of the printed circuit board 18. One end of the flexible neutral output metal piece 20 is soldered onto the printed circuit board 18, together with the neutral power output terminal 80, and is connected to the neutral power output wiring screw 109 located on the base 4. Two cantilever 20A, 20B extend out from the other end of the flexible neutral output metal piece 20. Two movable contacts 54, 22 are arranged at the end section of the cantilever 20A, 20B, respectively. Similarly, one end of the flexible hot output metal piece 21 is soldered onto the printed circuit board 18, together with the hot power output terminal 81, and is connected to the hot power output wiring screw 110 located on the base 4. Two cantilever 21A, 21B extend out from the other end of the flexible hot output metal piece 21. Two movable contacts 55, 23 are arranged at the end section of the cantilever 21A, 21B, respectively.

Figure 9A:
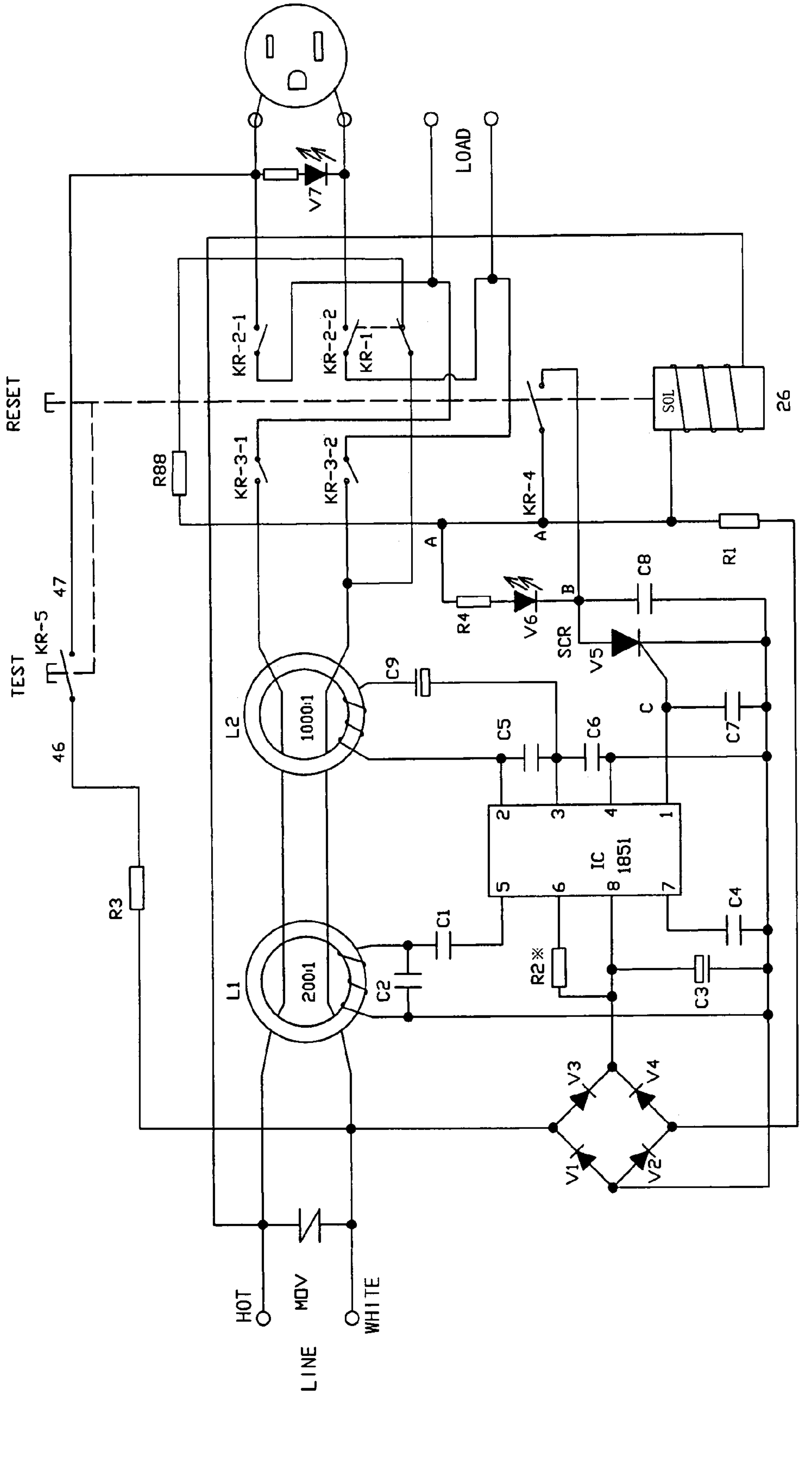
FIG. 9-A is a wiring diagram of an exemplary internal circuit of the leakage detection control chip (e.g., IC LM1851) of the GFCI.
Figure 9B:
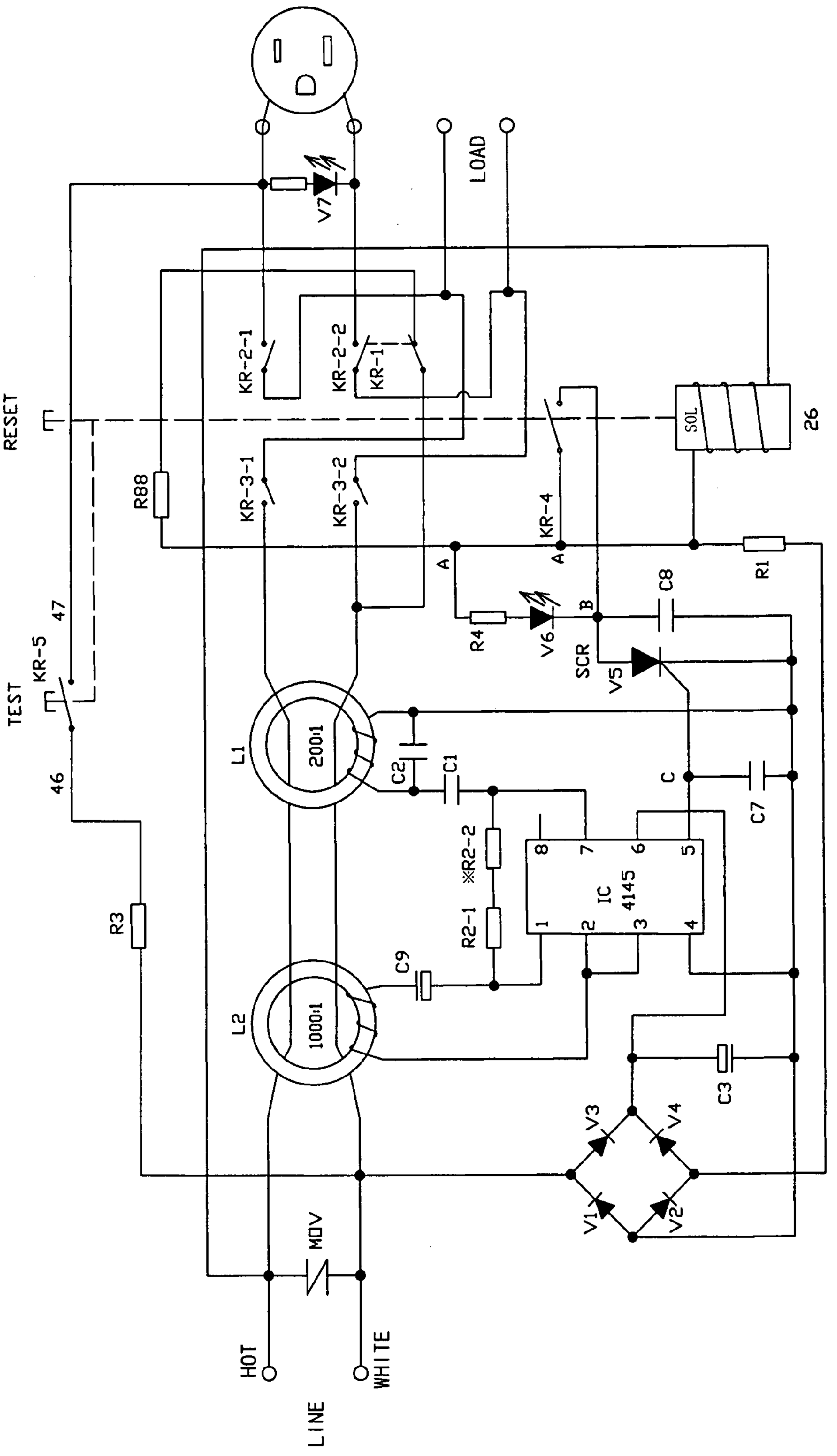

As shown in FIG. 4 and FIG. 3, the fixed contact 52 on the neutral power input metal piece 50 vertically corresponds to the movable contact 54 at the end section of one of the cantilevers 20A of the flexible neutral output metal piece 20. The fixed contact 52 and the movable contact 54 form a pair of switches. The movable contact 22 at the end section of the other cantilevers 20B of the flexible neutral output metal piece 20 vertically corresponds to the fixed contact 15 on the neutral power output conductor 13 placed on the side of the insulated middle support 3, forming another pair of switches. The fixed contact 53 on the hot power input metal piece 51 vertically corresponds to the movable contact 55 at the end section of one of the cantilevers 21A of the flexible hot output metal piece 21. The fixed contact 53 and the movable contact 55 form a pair of switches. The movable contact 23 at the end section of the other cantilevers 21B of the flexible hot output metal piece 21 vertically corresponds to the fixed contact 16 on the hot power output conductor 14 placed on the other side of the insulated middle support 3, forming another pair of switches. All of the movable and fixed contacts on the aforementioned "L" shaped power input metal pieces 50, 51, the power output conductors 13, 14 and the flexible output metal pieces 20, 21 constitute two groups and four pairs of switches 52 and 54, 22 and 15, 53 and 55, and 23 and 16, which respectively correspond to switches KR-3-2, KR-2-2, KR-3-1 and KR-2-1 in the wiring diagrams FIG. 9-A and FIG. 9-B. FIG. 9-A is a wiring diagram of an exemplary internal circuit of a leakage detection control chip (e.g., IC LM1851) of the GFCI. FIG. 9-B is a wiring diagram of another exemplary internal circuit of the leakage detection control chip (e.g., IC RV4145).

As shown in FIG. 9-A and FIG. 9-B, a differential transformer 19 (differential transformers L1, L2 in FIGS. 9-A, 9-B) is located on the printed circuit board 18 to detect a leakage current on the printed circuit board 18. A hot wire ("HOT") and a neutral wire ("NEUTRAL") penetrate through the differential transformer 19. When an electrical current leakage occurs in a power supply loop, the differential transformer 19 outputs a voltage signal to a leakage detection control chip IC (e.g., model number LM1851/RV4145). Pin 1 of the leakage detection control chip IC (LM1851) or Pin 5 of the leakage detection control chip IC (RV4145) outputs a control signal through a silicon controlled rectifier V5 to mechanically trip the devices on the printed circuit board 18 by releasing the reset button 8 so as to interrupt the power output.

Figure 5A:
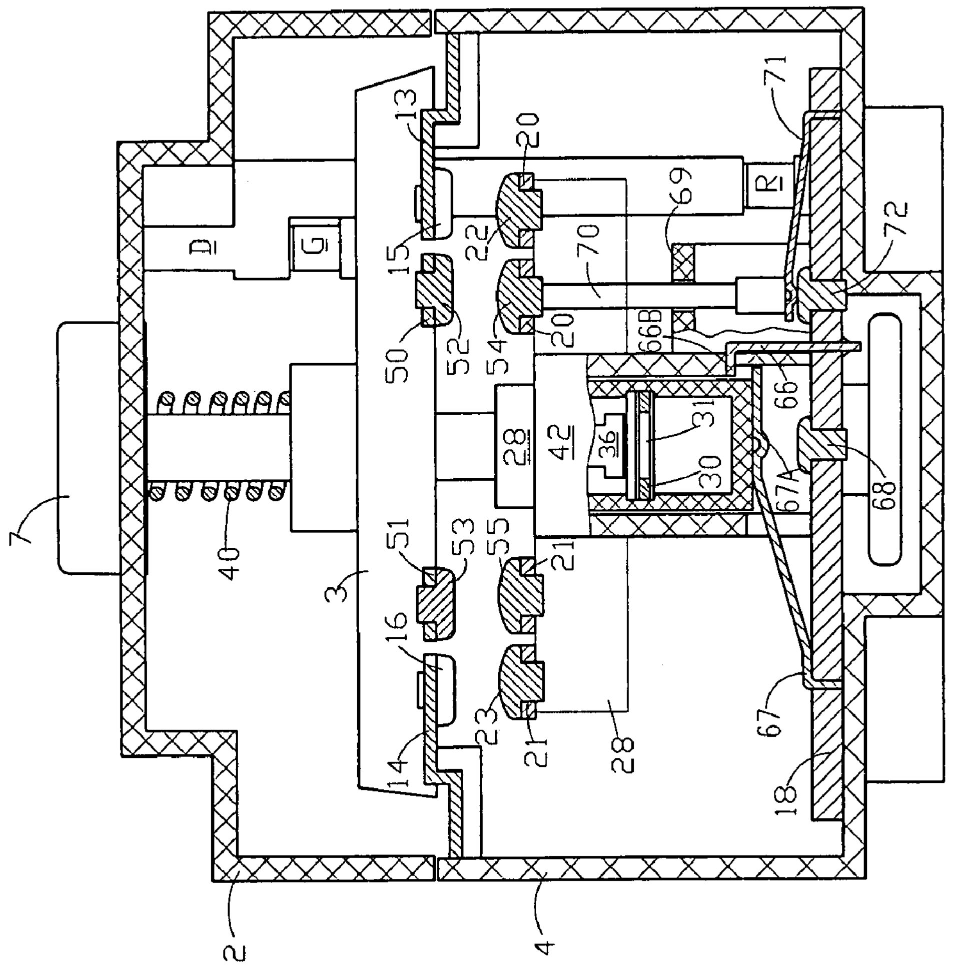
FIG. 5-A is a partial cross-sectional view along the A-A line in FIG. 3, illustrating the GFCI in an initial state without power output.
Figure 5B:
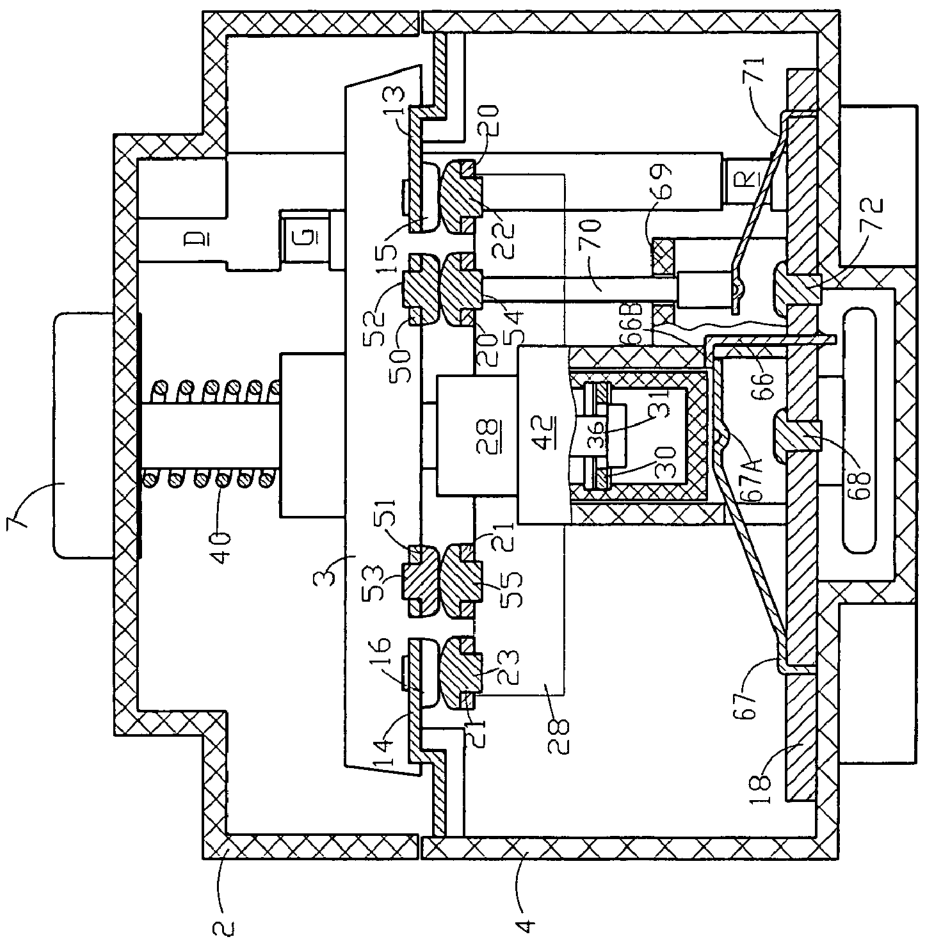

FIG. 5-A is a partial cross-sectional view along the A-A line in FIG. 3, illustrating the GFCI in an initial state without power output. FIG. 5-B is a partial cross-sectional view along the A-A line in FIG. 3, illustrating the GFCI when the reset button is reset and the GFCI is in a normal state.

As shown in FIG. 1, FIG. 4 and FIG. 5-A, a mechanical tripping device, which is located on the printed circuit board 18, may enable the power input metal pieces 50, 51 and the flexible power output metal pieces 20, 21 to be connected or disconnected, thus supplying power to or cutting off power from the power output conductors 13, 14, the power output terminals 80, 81 and the power output sockets 5, 6 of the front lid 2 through the flexible power output metal pieces 20, 21. The tripping device includes a tripper 28, a reset start switch KR-4, a reset directional lock 35, a reset spring 91, a locking device 30, a locking spring 34, a rotatable lever 37, and a solenoid coil 26, i.e., solenoid coil (SOL).

The tripper 28 can be of cylindrical structure or other shapes. It is located below the reset button 8. The left side and the right side of the tripper 28 extend outwardly to form a pair of cantilevers. The flexible power input metal pieces 50, 51 and the flexible power output metal pieces 20, 21 are located on the upper part of the cantilevers on both sides of the tripper 28 and can move up and down with the tripper 28.

As shown in FIG. 4, the tripper 28 contains a aperture 29 and can receive the reset directional lock 35, which is equipped with the reset spring 91 and is extended from the reset button 8. The reset directional lock 35 has a blunt end and is movable in a vertical direction in the aperture 29. A circular recessed locking slot 36 is formed in the lower part of the reset directional lock 35 close to the bottom of the reset directional lock 35 to form a groove.

A movable "L"-shaped locking device 30 made of a metal material is arranged in the lower part of tripper 28 which penetrates through the tripper 28. A through hole 31 is formed on the horizontal side of the locking device 30. When the GFCI is in its initial state with no power output, the reset directional lock 35 inside the aperture 29 of the tripper 28 is misaligned with the through hole 31 of the locking device 30. A circular slot 33 is formed between the side wall of tripper 28 and the inner side of locking device 30. The locking spring 34 is arranged in the circular slot 33.

The solenoid coil 26 with a built-in movable plunger 42 is arranged outside of the side wall of locking device 30. The movable plunger 42 inside the solenoid coil 26 faces but does not touch upon the side wall of locking device 30. The locking device 30 can move horizontally following the movement of the plunger 42, thus causing the reset button 8 to reset or release (trip).

Figure 8:
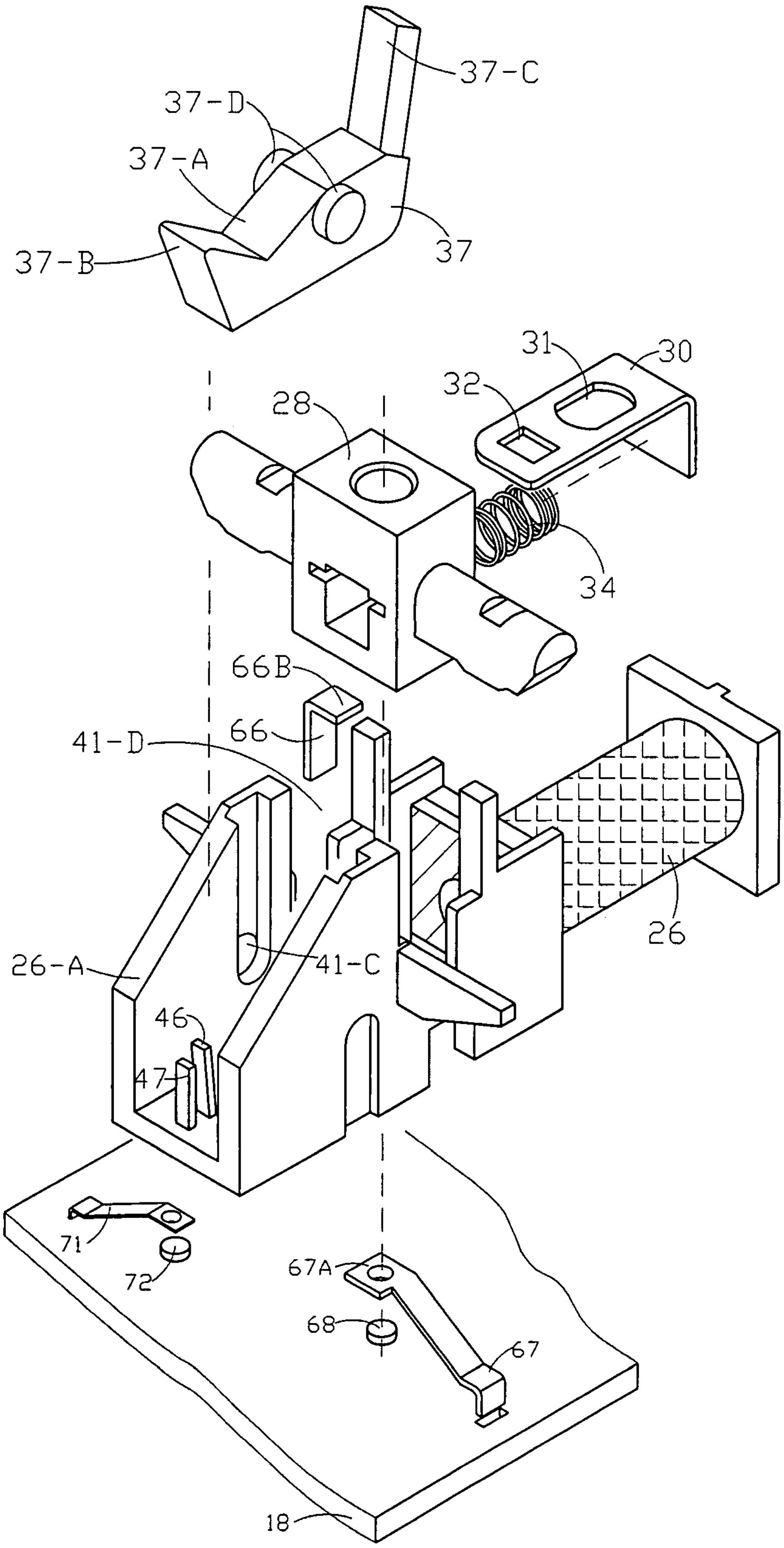
FIG. 8 is an exploded view illustrating an exemplary mechanical tripping device of the GFCI of FIG. 1.

FIG. 8 is an exploded view illustrating an exemplary mechanical tripping device of the GFCI of FIG. 1. As shown in FIG. 8, FIG. 5-A and FIG. 5-B, the reset start switch KR-4 (shown in FIGS. 9-A, 9-B) is arranged at the bottom of the tripper 28. The reset start switch KR-4 includes a spring piece 67, a "7" shaped metal piece 66, and a conductive pin 68. One end of the spring piece 67 is movable while the other end is soldered onto the printed circuit board 18. The conductive pin 68 is soldered onto the printed circuit board 18 and is arranged directly below the movable end of the spring piece 67. The "7" shaped metal piece 66 is soldered onto the printed circuit board 18 and is arranged next to the spring piece 67. Referring to FIGS. 9-A, 9-B, the spring piece 67 is connected to the input end of the hot wire through the solenoid coil 26. The conductive pin 68 and the "7" shaped metal piece 66 are connected to the neutral wire through the silicon controlled rectifier V5.

Figure 6A:
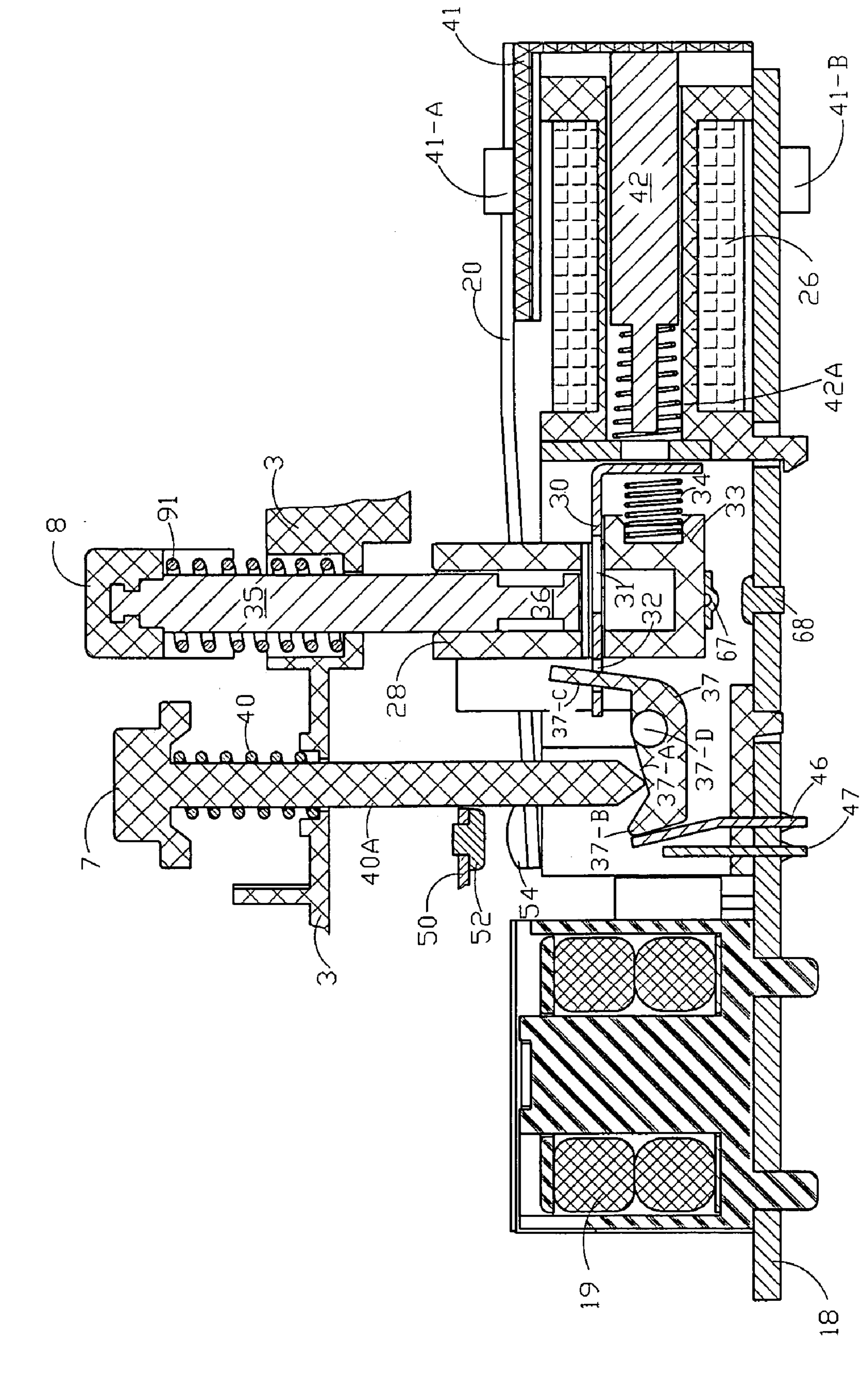
FIG. 6-A is a partial cross-sectional view along the B-B line in FIG. 3, illustrating the GFCI in an initial state without power output.
Figure 6B:
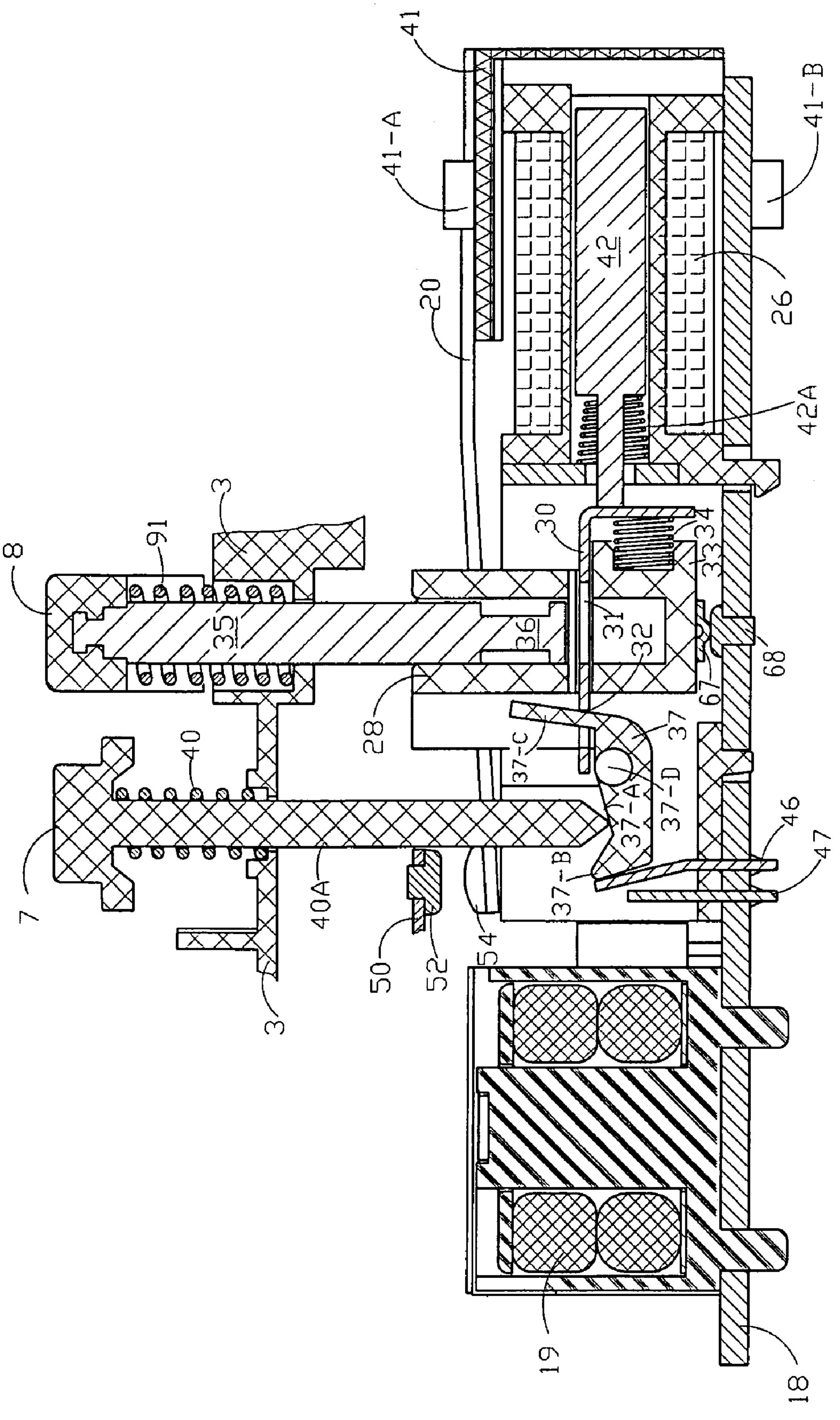
Figure 6C:
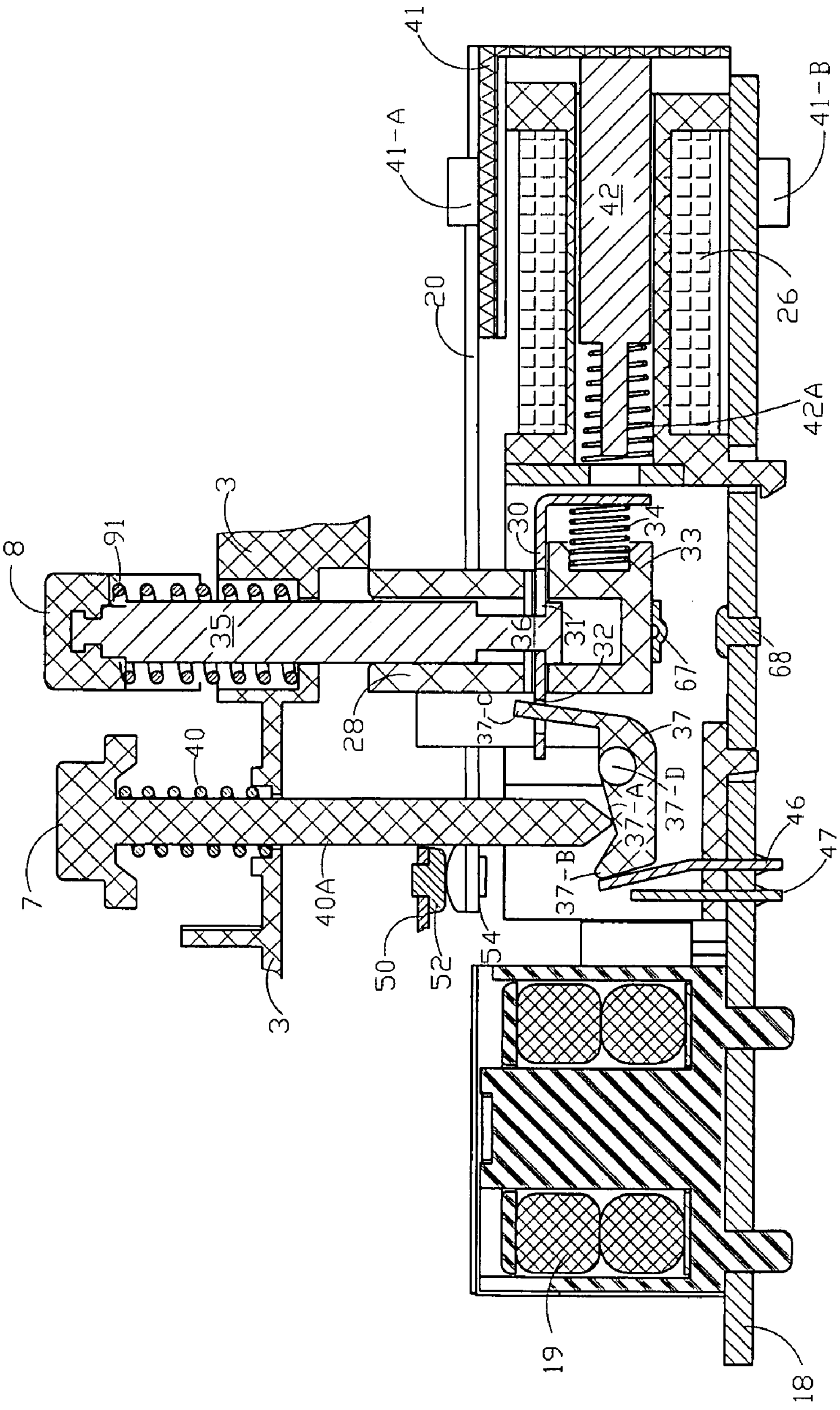
Figure 7A:
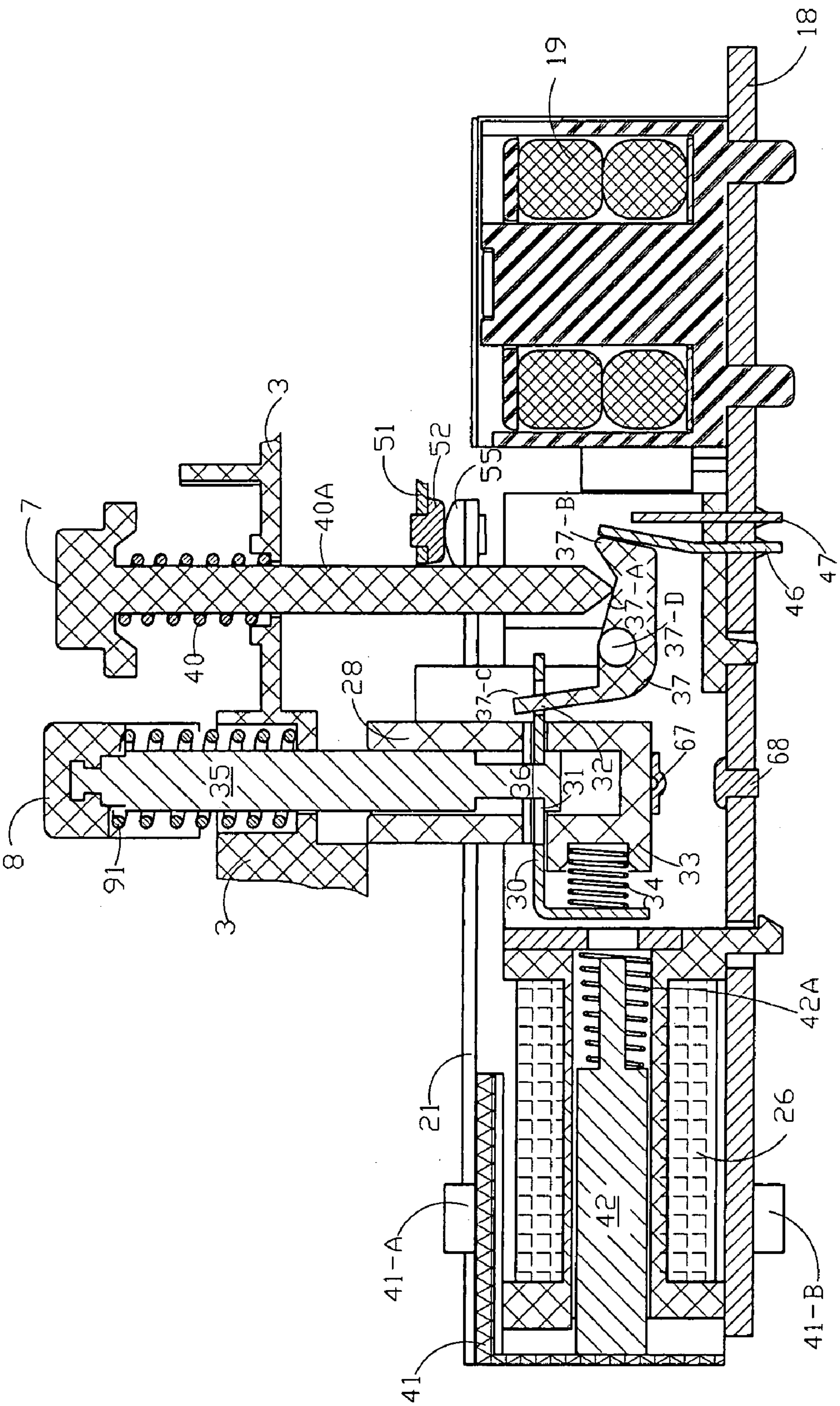
FIG. 7-A is a partial cross-sectional view along the C-C line in FIG. 3, illustrating the GFCI when it works normally with power output.
Figure 7B:
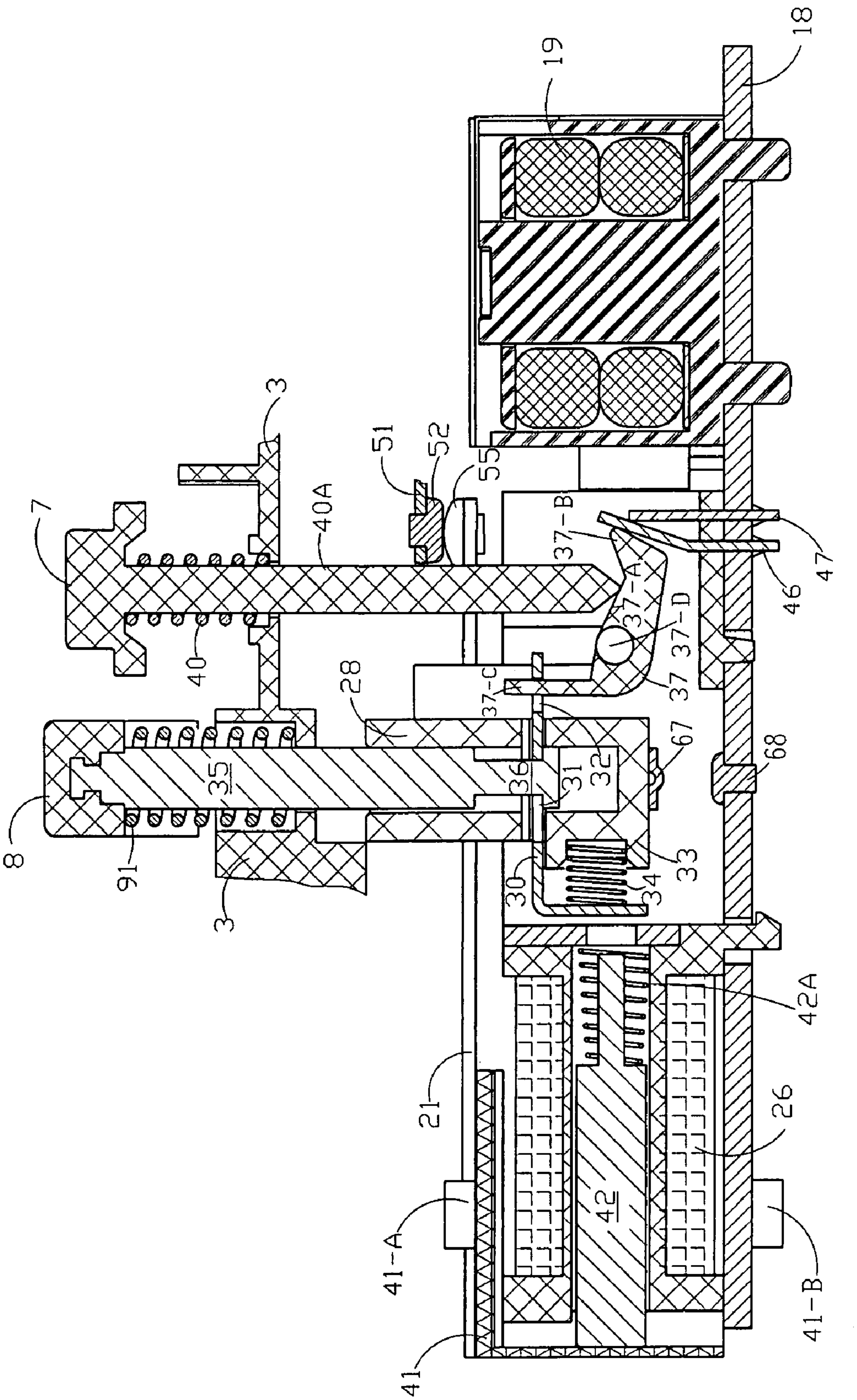
Figure 7C:
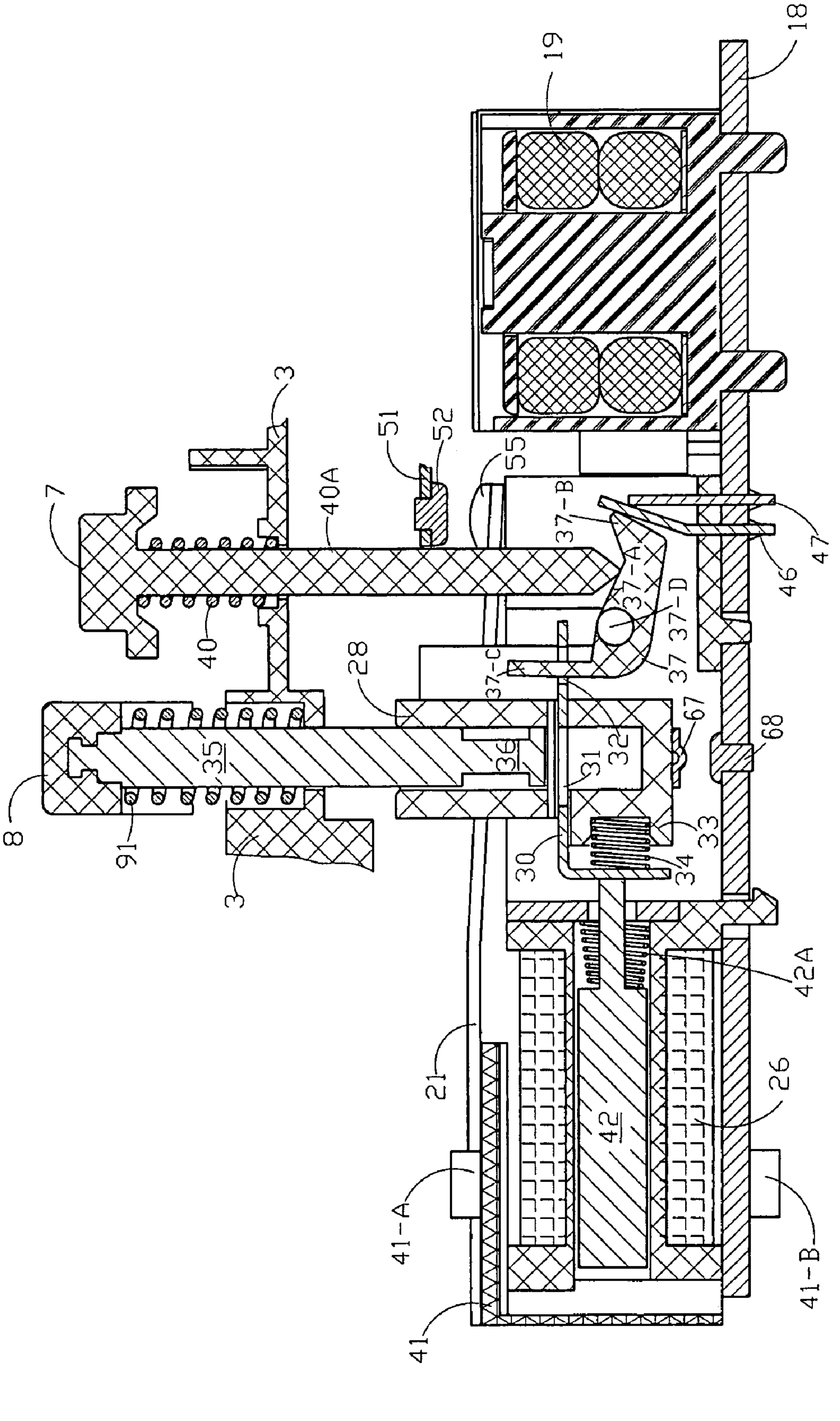
Figure 7D:
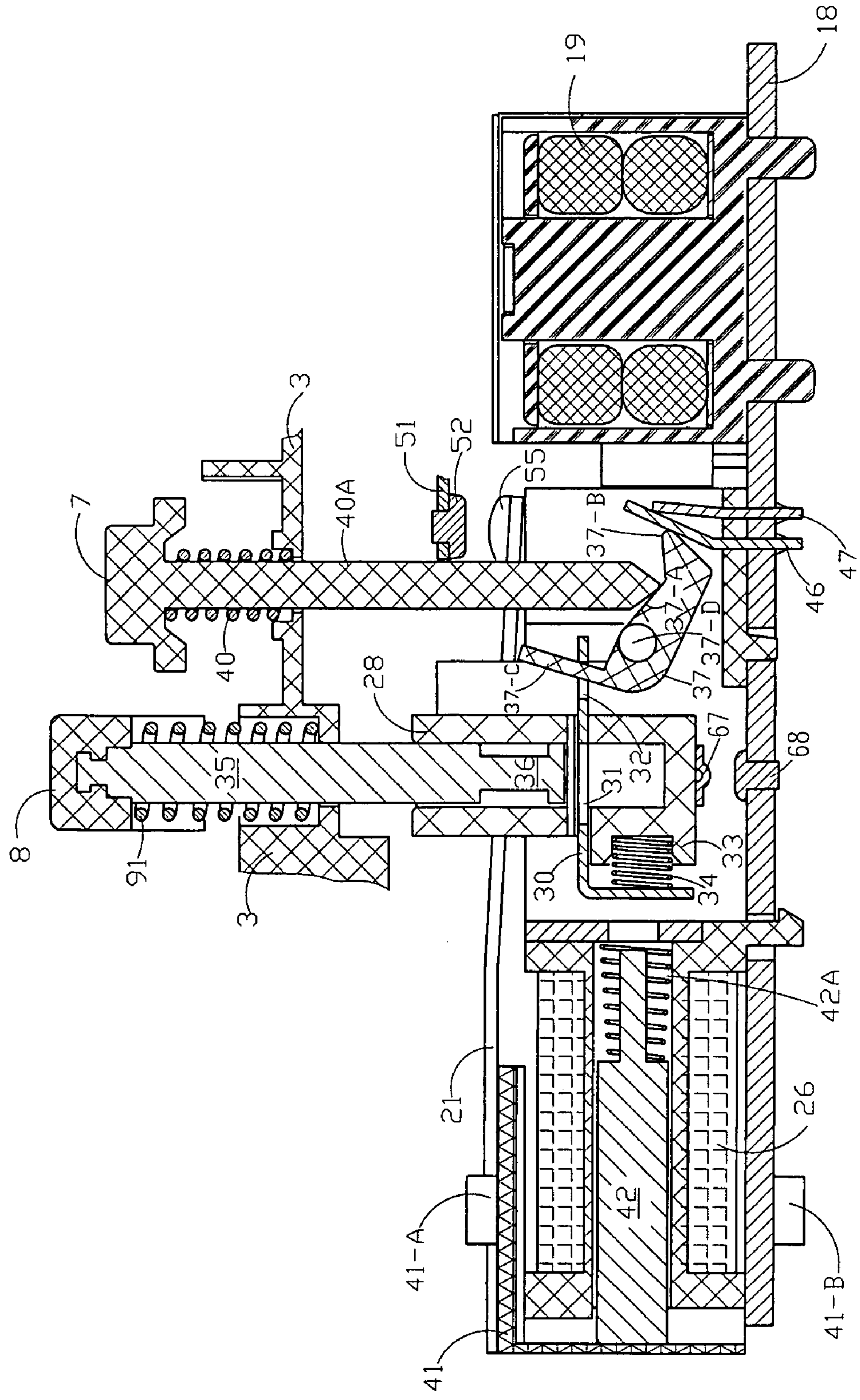

FIG. 6-A is a partial cross-sectional view along the B-B line in FIG. 3, illustrating the GFCI in an initial state without power output. FIG. 6-B is a partial cross-sectional view along the B-B line in FIG. 3, illustrating the GFCI the instant the reset button is pressed. FIG. 6-C is a partial cross-sectional view along the B-B line in FIG. 3, illustrating the GFCI when the reset button is reset and the GFCI is in a normal state.

The reset start switch KR-4 is coupled to the reset button 8 to reflect the state of the reset button 8. As shown in FIG. 5-A, FIG. 6-A, FIG. 9-A, and FIG. 9-B, when the reset button 8 is in a tripped state, the spring piece 67 of the reset start switch KR-4 does not come into contact with the conductive pin 68. The reset start switch KR-4 is in a disconnected state. As shown in FIG. 6-B, FIG. 9-A, and FIG. 9-B, when the reset button 8 is depressed, the tripper 28 moves downward. The bottom of the reset directional lock 35 touches the top of the locking device 30. The spring piece 67 of the reset start switch KR-4 comes into contact with the conductive pin 68. The reset start switch KR-4 is in a closed state. As shown in FIG. 5-B, FIG. 6-C, FIG. 9-A, and FIG. 9-B, when the circular recessed locking slot 36 at the bottom of the reset directional lock 35 is inside the through hole 31 of the locking device 30, releasing the reset button 8 causes the reset directional lock 35 to move up, releasing the reset spring 91, and pulling the tripper 28 to move up at the same time. The spring piece 67 of the reset start switch KR-4 is disconnected from the conductive pin 68 and comes into contact with the top section 66B of the “7” shaped metal piece 66. The reset start switch KR-4 remains in a closed state. Therefore, the present invention indicates the state of the reset button 8 through the state of the reset start switch KR-4.

As shown in FIG. 4, FIG. 6-A and FIG. 8, the rotatable spoon shaped rotatable lever 37 is arranged directly below the test button 7. The rotatable lever 37 is fastened in a directional slot 41-C in the front end of the solenoid coil using a lever axis 37-D. The rotatable lever 37 can rotate around the lever axis 37-D. Small V shaped slots 37-A and 37-B are arranged on the horizontal side of the spoon shaped rotatable lever 37. The downwardly extended pointed tip of the test button’s arm 40A, in which a slipped over spring 40 penetrates, is arranged inside the V shaped slots 37-A and 37-B. By pressing the test button 7, its downwardly extended arm 40A causes the rotatable lever 37 to rotate around the lever axis 37-D by pushing against the V shaped slots 37-A and 37-B. The upwardly inclined handle 37-C of the spoon shaped rotatable lever 37 penetrates through the hole 32 at the top of the locking device 30 near the test button 7. A pair of spring pieces 46 and 47 are arranged on the opposite side of the upwardly inclined handle 37-C of the spoon shaped rotatable lever 37.

The upper ends of the spring pieces 46 and 47 are open. When the test button 7 is not pressed, since the rotatable lever 37 is not rotating, the upper ends of the spring pieces 46 and 47 do not come into contact. The lower end of the spring piece 46 is soldered onto the printed circuit board 18 and is connected to the neutral wire of the power input end through a resistor (R3 in FIG. 9-A and FIG. 9-B). The lower end of the spring piece 47 is also soldered onto the printed circuit board 18 and is connected to the hot wire of the power output end.

As shown in FIG. 1 and FIG. 8, The spring pieces 46 and 47, the rotatable lever 37, and the tripper 28 are arranged at the front end of the solenoid coil. The spring pieces 46 and 47 penetrate through the solenoid coil support soldering on the printed circuit board 18. The rotatable lever 37 is arranged inside the directional slot 41-C between the spring pieces and the slot 41-D. The tripper 28 is arranged inside the slot 41-D.

The tripper 28, the locking device 30, the locking spring 34, the rotatable lever 37, and the reset start switch KR-4 are connected to each other to form an integral body that can move freely.

As shown in FIG. 1, FIG. 4, and FIG. 6-A, a coil protection cover 41 is arranged outside of the solenoid coil 26. A pair of lock hooks 41-A and 41-B are arranged on the top and bottom surfaces of the coil protection cover 41, respectively. The coil protection cover 41 is fastened onto the printed circuit board 18 through the lock hooks 41-B on the bottom surface. One end of each of the flexible output metal pieces 20, 21 that does not have a movable contact is fastened onto the coil protection cover 41 through the lock hooks 41-A on top of the coil protection cover 41 and is in close contact with the power output ends 80, 81. When the GFCI is assembled, one end of the mid-level support 3 presses down on the coil protection cover 41.

As shown in FIG. 5-A, FIG. 5-B, FIG. 8, FIG. 9-A, and FIG. 9-B, a plastic column 70 is arranged below the flexible output metal pieces 20 or 21 that are connected to the power output end (80 or 81). A status test switch (KR-1 in FIG. 9-A and FIG. 9-B) is arranged below the plastic column 70. The status test switch includes a spring piece 71 and a conductive pin 72. As shown in FIG. 9-A and FIG. 9-B, the spring piece 71 is connected to the hot wire of the power input end through a current limiting resistor R88 and the solenoid coil 26. The conductive pin 72 is connected to the neutral wire of the power input end.

As shown in FIG. 5-A, after the input end of the GFCI is connected to the hot and neutral wires inside the wall, and when the reset button 8 is in a released state, since there is no movement of the tripper 28, the flexible output metal pieces 20, 21 on the cantilevers on both sides of the tripper 28 are disconnected from the power input metal pieces 50 and 51. The GFCI has no power output. The spring piece 71 that constitutes the status test switch comes into contact with the conductive pin 72. The status test switch KR-1 is closed. As shown in FIG. 9-A and FIG. 9-B, the hot wire is connected to the status test switch KR-1 through the solenoid coil 26 and the resistor R88, and then make contact with the neutral wire forming a loop, thus automatically generating a simulated leakage current. At this time, the reset start switch KR-4 is disconnected.

When the reset button 8 is depressed and the status test switch KR-1 is still in a closed state, since the tripper 28 moves downwards, the bottom of the reset directional lock 35 makes contact with the top of the locking device 30, thus causing the spring piece 67 that constitutes the reset start switch KR-4 to come into contact with the conductive pin 68. The reset start switch KR-4 is in a closed state as shown in FIG. 6-B.

When the reset button 8 is depressed, as shown in FIG. 5-B, the circular recessed locking slot 36 at the bottom of the reset directional lock 35 is inside the through hole 31 of the locking device 30. When the reset button 8 is released, the reset directional lock 35 moves up and pulls the tripper 28, thus causing the flexible output metal pieces 20, 21 on the cantilever on the side of the tripper 28 to move up together, causing the spring piece 71 that constitutes the status test switch to be disconnected. The reset button 8 is in a reset state. The status test switch KR-1 is disconnected, the simulated leakage current automatically disappears, and the reset start switch KR-4 is still in a closed state.

FIG. 9-A and FIG. 9-B are the specific wiring diagram of the control circuit of the GFCI. As shown in the figures, the main components of the exemplary control circuit include differential transformers L1 (200:1) and L2 (1000:1) used for detecting leakage, the leakage detection control chip IC (LM1851/RV4145), the solenoid coil 26 with a built-in plunger, the silicon controlled rectifier V5, the status test switch KR-1, serially connected switches KR-2-1, KR-2-2, KR-3-1, KR-3-2, the reset start switch KR-4 coupled to the reset button, a reset indicator V6, a power output indicator V7, the current limiting resistor R88, and some relevant diodes, resistors and capacitors.

The hot wire and neutral wire on the power supply line for the GFCI penetrate through the differential transformers L1 and L2. The signal output ends of the differential transformers L1 and L2 are connected to the signal input ends 2, 3 and 5 of the leakage detection control chip IC (LM1851) or the signal input ends 1, 2, 3, 7 of the leakage detection control chip IC (RV4145). The control signal output pin 1 of the leakage detection control chip IC (LM1851) or the control signal output pin 5 of the leakage detection control chip IC (RV4145) is connected to the gate of the silicon controlled rectifier V5. The negative pole of the silicon controlled rectifier V5 is connected to the negative pole of the direct current power supply, and the positive pole of the silicon controlled rectifier V5 is connected to the hot wire through the reset start switch KR-4 coupled to the reset button and the solenoid coil 26. The built-in plunger of the solenoid coil causes the reset button to reset or release through a mechanical tripping device, thus causing the switches KR-2-1, KR-2-2, KR-3-1, KR-3-2 coupled to the reset button to close or disconnect, respectively.

The power output indicator V7 is connected between the hot wire and the neutral wire of the power output ends of the GFCI. The reset indicator V6 is serially connected to the silicon controlled rectifier V5.

The power input end neutral line penetrates through detection coils L1 (200:1) and L2 (1000:1) and is connected to the power input end hot line through the status test switch KR-1, the current limiting resistor R88, and the solenoid coil 26, forming a simulated leakage current loop. This circuit makes it possible for the power input end of the GFCI to automatically generate a simulated leakage current after it is properly connected to the power line inside the wall.

After the power input end of the GFCI is properly connected to the power line inside the wall and when the reset button is not depressed, since the status test switch KR-1 is in a closed state, the aforementioned simulated leakage current loop circuit automatically generates a simulated leakage current. As shown in FIG. 9-A, the simulated leakage current flows through the detection coil L2 (1000:1), which detects a voltage signal. The voltage signal is input into the signal input ends 2, 3 of the leakage detection control chip IC (LM1851) through a capacitor C9. The voltage signal is fed back and output to pins 5, 4 (public pole) through the leakage detection control chip IC (LM1851), and then fed to the detection coil L2 (1000:1) through to capacitors C1, C2 and the detection coil L1 (200:1). The voltage signal is sent back by the capacitor C9 to the signal input ends 3, 2 of the leakage detection control chip IC (LM1851). After the voltage signal is amplified, a high electric level control signal is output from pin 1 of the leakage detection control chip IC to the gate of the silicon controlled rectifier V5.

Alternatively, as shown in FIG. 9-B, an electric leakage current flows through the detection coil L2 (1000:1), which detects a voltage signal. The voltage signal is input to the signal input ends 1, 2, 3 of the leakage detection control chip IC (RV4145) through the capacitor C9 and is positively fed back to pins 7, 4 (public pole) through the leakage detection control chip IC (RV4145) and then fed into the detection coil L2 (1000:1) through the capacitors C1, C2, and the detection coil L1. The capacitor C9 sends back the voltage signal to the signal input ends 1, 2, 3 of the leakage detection control chip IC (RV4145). After the voltage signal is amplified, a high electric level control signal is output from pin 5 of the leakage detection control chip IC to the gate of the silicon controlled rectifier V5.

The silicon controlled rectifier V5 is triggered, and the positive pole and the negative pole are turned on. The reset indicator V6 connected on the indicator circuit between A and B emits light, indicating that the functions of the GFCI are intact and have protective functions against electric leakage current, and that the reset button can be reset. In contrast, if the GFCI has come to the end of its life, then the reset indicator V6 will never emit any light. The silicon controlled rectifier V5 will not come on and no electric current will ever flow through the solenoid coil 26, rendering it unable to generate a magnetic field. The internal plunger inside the solenoid coil 26 does not move and the mechanical tripping device will not move. The reset button cannot be reset, thus reminding the user that the GFCI has come to the end of its life and should be replaced with a new GFCI. Therefore, after the power input end is properly connected to the power line inside the wall, the GFCI automatically performs a test on the GFCI to ascertain whether the GFCI still has any protective functions against electric leakage current, i.e., whether it has come to the end of its life. The test result is automatically displayed to the user.

As shown in FIG. 9-A, FIG. 9-B, and FIG. 6-B, when the status test switch KR-1 is still closed, pressing the reset button 8 closes the reset start switch KR-4, which causes a short between points A and B. The voltages on both ends of AB are added to the solenoid coil 26, thus causing an electric current to flow through the solenoid coil 26, which generates a magnetic field. The plunger inside the solenoid coil 26 moves. The locking device 30 opens and the reset button 8 can be reset (as shown in FIG. 5-B and FIG. 6-C). At the same time, the reset indicator V6, i.e., light emitting diode, connected at points A and B is off, the status test switch KR-1 is disconnected, and simulated leakage current disappears. After the reset, closing the switches KR2-1, KR2-2, KR3-1, KR3-2 turns on the power output indicator V7 parallelly connected between the hot wire and neutral wire, indicating that both the power output socket on the surface of the GFCI and the load output end have power output. If the GFCI has come to the end of its life, no major electric current flows through the solenoid coil 26, which is unable to generate a magnetic field. Its built-in plunger will not move the locking device 30, and the reset button will never be able to reset. Neither the power output socket on the surface of the GFCI nor the load output end will have power output. The reset indicator V6 and the power output indicator V7 are both off.

When the GFCI is functioned properly, after the GFCI is properly connected to the power line and after the reset button is pressed, the load output end and the surface of the GFCI have power output. The GFCI works normally (as shown in FIG. 5-B and FIG. 6-C). At this time, when an electric leakage current is generated inside the circuit, due to the fact that hot wire and neutral wire both penetrate through the detection coils L1 (200:1) and L2 (1000:1) concurrently, the vector sum of the electric current that penetrates through the detection coil on the two circuits is not zero. As shown in FIG. 9-A, the detection coil immediately detects a voltage signal. The voltage signal passes through the capacitor C9 and is output to the signal input ends 2, 3 of the leakage detection control chip IC (LM1851) and is negatively fed back into the output ends 5, 4 (public pole) of the leakage detection control chip IC (LM1851) and then fed to the detection coil L2 (1000:1) through the capacitor C1, C2 and the detection coil L1 (200:1). The voltage signal is then sent back to the signal input ends 3, 2 of the leakage detection control chip IC (LM1851) through the capacitor C9. The signal is amplified and a release signal is output from pin 1 of the leakage detection control chip IC (LM1851) to the gate of silicon controlled rectifier V5, or as shown in FIG. 9-B, the detection coil immediately detects a voltage signal. The voltage signal passes through the capacitor C9 and is output to the signal input ends 1, 2, 3 of the leakage detection control chip IC (RV4145). The voltage signal is positively output to pins 7, 4 (public pole) through the leakage detection control chip IC (RV4145), and then fed to the detection coil L2 (1000:1) through the capacitors C1, C2 and the detection coil L1 (200:1). The capacitor C9 sends back the voltage signal to the signal input ends 1, 2, 3 of the leakage detection control chip IC (RV4145). After the signal is amplified, a high electric level control signal is sent from pin 5 of the leakage detection control chip IC to the gate of the silicon controlled rectifier V5.

The silicon controlled rectifier V5 is triggered, the positive pole and the negative pole are turned on, thus causing point B on the positive pole of the silicon controlled rectifier V5 to have a low potential. Since the reset start switch KR-4 is in closed position, points A and B are the same. Because the other end of the solenoid coil 26 is connected to the hot wire, both ends of the solenoid coil 26 will receive a voltage. An electric current flows through the solenoid coil 26 and generates a magnetic field. Its internal plunger moves, causing the reset button to release and cut off power output. As shown in FIG. 5-A and FIG. 6-A, the power output indicator V7 is off and the reset indicator V6 comes on.

FIG. 7-A is a partial cross-sectional view along the C-C line in FIG. 3, illustrating the GFCI when it works normally with power output. FIG. 7-B is a partial cross-sectional view along the C-C line in FIG. 3, illustrating the GFCI the instant the test button is pressed. FIG. 7-C is a partial cross-sectional view along the C-C line in FIG. 3. illustrating the GFCI when the test button is depressed and the GFCI is tripped with no power output. FIG. 7-D is a partial cross-sectional view along the C-C line in FIG. 3, illustrating the GFCI when the test button is continually pressed to forcibly release the GFCI and to cut off the power output of the GFCI.

Pressing the test button 7 may manually simulate an electric leakage current to detect whether the GFCI has come to the end of its life. Continually pressing the test button 7 may forcibly and mechanically cut off the power output of the GFCI. As shown in FIG. 7-A, the rotatable spoon shaped rotatable lever 37 is arranged directly below the test button 7. The rotatable lever 37 is arranged inside the directional slot 41-C in the front end of the solenoid coil 26 and can rotate around the lever axis 37-D. The small V shaped slots 37-A and 37-B are arranged on the rotatable lever 37. The downwardly extended pointed tip of the test button's arm 40A, in which a slipped over spring 40 penetrates, is arranged inside the V shaped slots 37-A and 37-B. By pressing the test button 7, its downwardly extended arm 40A causes the rotatable lever 37 to rotate around the lever axis 37-D by pushing against the V shaped slots 37-A and 37-B. The upwardly inclined handle 37-C of the spoon shaped rotatable lever 37 penetrates through the hole 32 at the top of the locking device 30 near the test button 7. A pair of spring pieces 46 and 47 are arranged on the opposite side of the upwardly inclined handle 37-C of the spoon shaped rotatable lever 37.

The upper ends of the spring pieces 46 and 47 are open. When the test button 7 is not pressed, since the rotatable lever 37 is not rotating, the upper ends of the spring pieces 46 and 47 do not come into contact. The lower end of the spring piece 46 is soldered onto the printed circuit board 18 and is connected to the neutral wire of the power input end through a resistor (R3 in FIG. 9-A and FIG. 9-B). The lower end of the spring piece 47 is also soldered onto the printed circuit board 18 and is connected to the hot wire of the power output end.

As shown in FIG. 7-B, pressing down on the test button 7 to a first position causes the lower end of the test button 7 to press against the top surface 37-A of the rotatable lever 37, which causes the rotatable lever 37 to rotate around the lever axis 37-D and to push the spring piece 46. When the spring piece 46 makes contact with the spring piece 47, an electric leakage current is artificially generated. If the GFCI works normally and has protective functions against any electric leakage current, as shown in FIG. 7-C, the GFCI's mechanical tripping device moves the locking device 30 and causes the reset button 8 to release or trip, thus cutting off the power output of the GFCI.

If pressing the test button 7 from a static state to the first position to generate the electric leakage current will not trip the GFCI, this indicates that the GFCI has come to the end of its life. As shown in FIG. 7-D, a user may continue to press the test button 7 down to a second position to forcibly cut off the power output of the GFCI through a mechanical device. As shown in FIG. 7-D, when the GFCI has come to the end of its life and cannot be tripped, continue pressing the test button 7 causes the downwardly extended arm 40A of the test button 7 to continue to press the top surface 37-A of the rotatable lever 37, so that the rotatable lever 37 continues to rotate around the lever axis 37-D. The upwardly inclined handle 37-C of the rotatable lever 37 extending into the through hole 32 of the locking device 30 pulls the locking device 30, so that the circular recessed locking slot 36 of the reset directional lock 35 jumps out of through hole 31 of the locking device 30. The tripper 28 drops down, causing the flexible output metal pieces 20 and 21 to drop down at the same time, which causes their movable contacts to be disconnected from the fixed contacts on the power output conductors 13 and 14 and the fixed contacts on the power input metal pieces 50, 51. The power output conductors 13, 14 and the power output end 80, 81 are not energized, forcibly cutting off the power output of the GFCI.

When there is a need to test whether functions of the GFCI are normal, a user may also press the test button 7 to cause the upper ends of spring pieces 46, 47 to come into contact, generating a simulated leakage current. If the GFCI works normally and has not come to the end of its life, the differential transformer will detect a voltage signal and output the voltage signal to the signal input ends 2, 3, 5 of the leakage detection control chip IC (LM1851) or the signal input ends 1, 2, 3, 7 of the leakage detection control chip IC (RV4145). Pin 1 of the leakage detection control chip IC (LM1851) or pin 5 of the leakage detection control chip IC (RV4145) outputs an electric leakage current trigger signal, which is output to the gate of the silicon controlled rectifier V5, so that the silicon controlled rectifier V5 is triggered and turned on, and the circuit interrupting device is tripped. Since the reset start switch KR-4 is open, an electric current path is formed from the hot wire through the solenoid coil 26, the resistor R4, the reset indicator V6, and the silicon controlled rectifier V5 to the grounding terminal. The reset indicator V6 is on, indicating that the functions of the GFCI are functioned properly and the GFCI can be reset. When the GFCI has come to the end of its life, a failure of the internal components may interrupt the electric leakage current detection functions. Pin 1 of the leakage detection control chip IC (LM1851) or pin 5 of the leakage detection control chip IC (RV4145) does not have any control signal output, and the silicon controlled rectifier V5 cannot be triggered and the solenoid coil 26 cannot be energized. After the power output of the GFCI being forcibly cut off the reset indicator light V6 cannot be turned on. Therefore, pressing the reset button 8 cannot complete the reset. This indicates that the GFCI has experienced an internal failure. In other words, the GFCI has come to the end of its life and should be promptly replaced.

If the failure of the GFCI is not eliminated, the mechanical tripping device cannot function. Thus preventing the reset button 8 from being reset. The GFCI does not have power output.

In the circumstances above, the control signal from pin 1 of the leakage detection control chip IC (LM1851) or pin 5 of the leakage detection control chip IC (RV4145) passes through and filters by an anti-interference capacitor C7 between the control end of the silicon controlled rectifier V5 and the grounding terminal to prevent any triggering by mistake.

As shown in FIG. 9-A and FIG. 9-B, when an electrician erroneously connects the power line inside the wall to the output end of the GFCI, the GFCI can automatically prevent the generation of a simulated leakage current. The leakage detection control chip IC cannot generate a control signal, the silicon controlled rectifier V5 cannot be turned on, and no electric current flows through the solenoid coil 26, so that the solenoid coil 26 cannot generate a magnetic field to push its built-in plunger. As a result, the mechanical tripping device cannot move, and the reset button 8 cannot be reset. The switches KR-3-1, KR-2-1, KR-3-2, KR-2-2 that are coupled to the reset button 8 cannot be closed. The power input end of the GFCI "LINE" and the power output sockets 5, 6 on the face of the front lid 2 of the GFCI do not have power output. The reset indicator V6 is off, indicating a wiring error. It is only after the electrician wires properly that the reset indicator V6 is on and the reset button 8 can be reset, and the power output end of the GFCI and the power output sockets 5, 6 on the face of the front lid 2 of the GFCI will have power output.

As shown in FIG. 9-A, FIG. 9-B, FIG. 1 and FIG. 5-A, a red reset indicator V6 (R) is arranged on the printed circuit board 18 to indicate whether the GFCI has come to the end of its life. A green or yellow power output indicator V7 (G) is arranged on the mid-level support 3 to indicate the status of the GFCI, e.g., whether there is power output. The reset indicator V6 and the power output indicator V7 deflect the light emitted through a light guide tube D onto the surface of the GFCI, so that the light is exposed from the status indicating light hole 30-A as shown in FIG. 2. When the power input end of the GFCI is properly connected to the hot wire and the neutral wire inside the wall, as long as the GFCI has not come to the end of its life and still has protective functions against electric leakage current, the reset indicator V6 is on. If the GFCI has come to the end of its life, the reset indicator V6 does not come on. When GFCI has not come to the end of its life and has power output, the reset indicator V6 is off and the power output indicator V7 is on. In contrast, when the GFCI has come to the end of its life and has no power output, the reset indicator V6 is off and the power output indicator V7 is off. Therefore, the user can determine whether the GFCI has come to the end of its life and determined its status by the state of the indicators V6 and V7.

As shown in FIG. 4, two pairs of position limiting pieces 43, 44 are arranged below the flexible power output metal pieces 20, 21.

Based on the above description, since the present invention uses the above technical solution, the GFCI disclosed by the present invention has the following functions:

(1) The GFCI Can Automatic Display the Result of an End of Life Test.

After the power input end of the GFCI is properly connected to the power line inside the wall, a simulated leakage current can be automatically generated to detect whether the GFCI still has protective functions against any electric leakage current, that is, whether it has come to the end of its life. The result is automatically displayed.

When the internal components of the GFCI are intact and the reset indicator is constantly on, it indicates that a proper reset mechanism can be automatically set up and reset is possible. After a reset, the reset indicator is off and the power output indicator is constantly on, indicating that the GFCI can work normally.

When the internal components of the GFCI have an open or short circuit, that is, when they come to the end of their lives, the reset indicator does not come on, indicating that the GFCI has come to the end of its life. The reset button cannot be reset, thus, and the GFCI's output end and the power output sockets on the surface of the GFCI do not have any power output.

(2) The GFCI has Mechanical Release Capabilities.

When the components inside the GFCI do not function, especially when the solenoid coil fails, the GFCI can be forcibly tripped or released by mechanical means, thus forcibly cutting off its power output. As a result the GFCI that has come to the end of its life cannot be reset.

(3) The GFCI has Manual Detection Capabilities and can Automatically Display the Detection Result.

When an electric leakage current is generated by manual simulation and the GFCI can be tripped or released, the reset indicator is constantly on, indicating that the GFCI can work normally and can be reset. After the reset, the power output indicator is constantly on.

When an electric leakage current is generated by manual simulation and the GFCI cannot be tripped or released, the reset indicator is off, indicating that the GFCI has come to the end of its life. The present invention can prevent the reset button from being reset, thus causing the power output socket on the surface of the GFCI and the load output end not to have power output.

(4) The GFCI can Prevent Reverse Wiring Errors.

When an electrician erroneously connects the power line inside the wall to the power output end of the GFCI, the present invention can automatically prevent the generation a simulated leakage current. The electric leakage current detection chip IC cannot generate a control signal, the silicon controlled rectifier V5 cannot be turned on, no electric current flows through inside the solenoid coil, no magnetic field can be generated to push its built-in plunger to move to disable the mechanical tripping device, the reset button can never be reset and the switches KR-3-1, KR-2-1, KR-3-2, KR-2-2 coupled to the reset button cannot be closed. The power input end of the GFCI "LINE" and the power output sockets on the surface of the GFCI do not have power output. The reset indicator V6 is off, indicating a wiring error. It is only when the installer properly connects the lines that the reset indicator V6 will be on, the reset button can be reset, and the power output end of the GFCI and the power output sockets on the surface of the GFCI have power output.

The exemplary GFCI can be widely applied, is safe and easy to use, thus effectively ensuring the personal safety of the user as well as the safety of appliances.

While the GFCI with an automatic end-of-life test has been described in connection with an exemplary embodiment, those skilled in the art will understand that many modifications in light of these teachings are possible, and this application is intended to cover variations thereof. Therefore, the scope of the appended claims should be accorded the broadest interpretation so as to encompass all such modifications.

We claim:

1. A circuit interrupting device comprising an input power end, an output power end, and a user accessible output end, wherein said circuit interrupting device is capable of establishing and/or disconnecting electrical continuity between said input power end and said output power end and said user accessible output ends, wherein said circuit interrupting device comprising a status test switch (KR-1) which is automatically turned on to perform an end of life test of components of said circuit interrupting device when said circuit interrupting device is powered by electrically connecting to an input power line, an output power line, and a user accessible line properly and when a reset button of said circuit interrupting device is at a tripped position;

wherein said KR-1 comprises a fixed contact point adapted to electrically connect to one of said input power lines, and a flexible metal piece adapted to electrically connect to the other of said input power lines through a resistor and/or a solenoid coil which, when said circuit interrupting device is powered, generates a simulated fault to test said components of said circuit interrupting device; and wherein said KR-1 is not physically contacted with said reset button;

whereby when said components of said circuit interrupting device are functioned properly, said circuit interrupting device can be reset; and whereby when at least one of said components of said circuit interrupting device is not functioned properly, said circuit interrupting device cannot be reset.

2. The circuit interrupting device according to claim 1, wherein circuit interrupting device is a ground fault circuit interrupter, an arc fault circuit interrupter, an immersion detection circuit interrupter, an appliance leakage circuit interrupter, or a circuit breaker.

3. The circuit interrupting device according to claim 1, wherein said components of said circuit interrupting device comprises a differential transformer (DT), an integrated circuit (IC), a silicon controlled rectifier (SCR), and a solenoid coil (SOL).

4. The circuit interrupting device according to claim 1, further comprising a reset indicator light; wherein said reset indicator light is on when said components of said circuit interrupting device are functioned properly; wherein said reset indicator light is off when at least one of said components of said circuit interrupting device is not functioned properly.

5. The circuit interrupting device according to claim 1, further comprising an output indicator light connected between a hot wire and a neutral wire of said output power end; wherein when there is electricity flowing between said hot wire and said neutral wire of said output power end, said output indicator light is turned on.

6. The circuit interrupting device according to claim 1, further comprising a reset start switch (KR-4) which comprises a spring piece, a conductive pin, and a 7-shaped metal piece;

wherein said KR-4 is located below a tripper of said circuit interrupting device;

wherein said spring piece has a fixed end and a cantilever end; said fixed end of said spring piece being soldered to a printed circuit board, said cantilever end being above said conductive pin; said spring piece being adapted to electrically connected to said hot wire of said input power line through a solenoid coil;

wherein said 7-shaped metal piece has a top portion and a bottom portion; said top portion of said 7-shaped piece being above said cantilever end of said spring piece and said bottom portion being soldered on said printed circuit board;

wherein said 7-shaped metal piece and said conductive pin are connected to ground through a silicon controlled rectifier (SCR);

whereby when said circuit interrupting device is properly wired, a depression of said reset button turns on said KR-4, which allows said cantilever end of said spring piece to be in contact with said conductive pin to allow reset; and whereby when said circuit interrupting device is in a reset position, said cantilever end of said spring piece disconnects with said conductive pin and is in contact with said top portion of said 7-shaped metal piece.

7. The circuit interrupting device according to claim 6, wherein when said circuit interrupting device is reset, said KR-1 is turned off.

8. The circuit interrupting device according to claim 1, wherein said circuit interrupting device comprises:

a housing;

a tripping device positioned in a base of said housing;

a printed circuit board positioned in said base of said housing; said printed circuit board comprising:

a pair of power input metal pieces having a first end and a second end; wherein said first end of each of said pair of power input metal pieces passes through a differential transformer to be soldered to said printed circuit board and is operationally connected to said hot wire or said neutral wire of said input power line, respectively; wherein said second end of each of said second pair of power input metal pieces has a fixed contact;

a pair of flexible power output metal pieces each comprising a pair of cantilevers; wherein each end of said pair of cantilevers has a movable contact; wherein each of said pair of flexible power output metal pieces is operationally connected to a hot wire or a neutral wire of said output power line, respectively;

a pair of power output conductors each having two ends; wherein each end of each pair of power output conductors is connect to a hot wire outlet or a neutral wire outlet on said user accessible output end by a pair of gripping wing pieces, respectively; wherein each of said power output conductors contains a fixed contact;

wherein said fixed contact on each of said pair of power input metal pieces is capable of contacting with one of said movable contact on one of said pair of cantilevers of each of said pair of flexible power output metal pieces; and wherein said fixed contact on each of said pair of power output conductors is capable of contacting with the other movable contact on one of said pair of cantilevers of each of flexible power output metal pieces to establish or disconnect electrical continuity between said input power end and said output power end and said user accessible output ends.

9. The circuit interrupting device according to claim 8, wherein said tripping device comprises a tripper which contains an aperture to receive a directional lock extended from said reset button;

a reset start switch (KR-4) which locates beneath said tripper and, when turned on, allows reset;

a locking device having a locking spring and containing a first through hole and a second through hole; wherein said first through hole is capable of aligning with said aperture of said tripper to receive said directional lock; wherein said locking device threads through said tripper; and a solenoid coil (SOL) having a plunger, wherein when said SOL is energized, said plunger plunges onto a side wall of said locking device causing said first through hole to align with said aperture of said tripper to reset or trip said circuit interrupting device.

10. The circuit interrupting device according to claim 9, wherein said tripper has a pair of arms extended from a left side and a right side of said tripper; wherein said pair of cantilevers of said flexible power output metal pieces is rested on said pair of arms of said tripper.

11. The circuit interrupting device according to claim 10, wherein said directional lock of said reset button has a blunt end and a groove above said blunt end; wherein said directional lock is capable of penetrating said aperture of said tripper and said first through hole of said locking device when said first through hole of said locking device is aligned with said aperture of said tripper to reset or trip said circuit interrupting device.

12. The circuit interrupting device according to claim 8, wherein said KR-1 is located beneath a plastic column, which is located underneath one of said pair of flexible power output metal pieces;

whereby when said reset button is at said tripped state, said pair of flexible power output metal pieces is at a downward position which pushes said flexible metal piece of said KR-1 to be in contact with said fixed contact point of said KR-1 to automatically turn on said end-of-life test; and whereby when said reset button is at a reset position, said pair of flexible power output metal pieces is at an upward position which separates said flexible metal piece of said KR-1 from said fixed contact point of said KR-1 to discontinue said end-of-life test.

13. The circuit interrupting device according to claim 8, wherein said second through hole of said locking device receives an upward inclined handle of a rotatable lever; and wherein said rotable lever comprises said upward inclined handle, a lever axis, and a v-shaped slot;

whereby a pulling of said upward inclined handle of said rotatable lever allows said first through hole of said locking device to be aligned with said aperture of said tripper.

14. The circuit interrupting device according to claim 13, wherein said v-shaped slot is capable of receiving an end of an arm extended from a test button.

15. The circuit interrupting device according to claim 14, wherein a pair of metal pieces are situated along a side of said rotatable lever; wherein said pair of metal pieces does not contact with each other when said rotatable lever is not rotated; wherein when said rotatable lever is rotated downward, said side of said rotatable lever pushes said pair of metal pieces to be in contact with each other.

16. The circuit interrupting device according to claim 15, wherein said test button has a first level and a second level depression.

17. The circuit interrupting device according to claim 16, wherein when said test button is depressed at said first level, said end of said extended arm of said test button pushes said v-shaped slot of said rotatable lever to cause said rotatable lever to rotate around said lever axis and thereby pushes said pair of metal pieces to be in contact with each other, thereby simulated a fault to test components of said circuit interrupting device.

18. The circuit interrupting device according to claim 17, wherein when said depression of said test button does not cause a simulation of a fault to trip said circuit interrupting device, a further depression of said test button at said second level causes said circuit interrupting device to be mechanically tripped.

19. A circuit interrupting device comprising an input power end, an output power end, and a user accessible output end, and is capable of establishing and/or disconnecting electrical continuity, wherein said circuit interrupting device comprising a reset start switch (KR-4) which comprises a spring piece, a conductive pin, and a 7-shaped metal piece;

wherein said KR-4 is located below a tripper of said circuit interrupting device;

wherein said spring piece has a fixed end and a cantilever end; said fixed end of said spring piece being soldered to a printed circuit board, said cantilever end being above said conductive pin; said spring piece being adapted to electrically connected to said hot wire of said input power line through a solenoid coil;

wherein said 7-shaped metal piece has a top portion and a bottom portion; said top portion of said 7-shaped piece being above said cantilever end of said spring piece and said bottom portion being soldered on said printed circuit board;

wherein said 7-shaped metal piece and said conductive pin are connected to ground through a silicon controlled rectifier;

whereby when said circuit interrupting device is properly wired, a depression of said reset button turns on said KR-4, which allows said cantilever end of said spring piece to be in contact with said conductive pin to allow reset;

whereby when said circuit interrupting device is in a reset position, said cantilever end of said spring piece disconnects with said conductive pin and is in contact with said top portion of said 7-shaped metal piece.

20. The circuit interrupting device according to claim 19, wherein when said circuit interrupter is miswired or reverse wired, a depression of said reset button of said circuit interrupting cannot reset said circuit interrupting device.

21. A ground fault circuit interrupter (GFCI) comprising an input power end, an output power end, and a user accessible output end, wherein said circuit interrupting device is capable of establishing and/or disconnecting electrical continuity between said input power end and said output power end and said user accessible output ends, wherein said ground fault circuit interrupter comprises:

a housing;

a tripping device positioned in a base of said housing;

a printed circuit board positioned in said base of said housing; said printed circuit board comprising:

a pair of power input metal pieces having a first end and a second end; wherein said first end of each of said pair of power input metal pieces passes through a differential transformer to be soldered to said printed circuit board and is operationally connected to said hot wire or said neutral wire of said input power line, respectively; wherein said second end of each of said second pair of power input metal pieces has a fixed contact;

a pair of flexible power output metal pieces each comprising a pair of cantilevers; wherein each end of said pair of cantilevers has a movable contact; wherein each of said pair of flexible power output metal pieces is operationally connected to a hot wire or a neutral wire of said output power line, respectively;

a pair of power output conductors each having two ends; wherein each end of each pair of power output conductors is connect to a hot wire outlet or a neutral wire outlet on said user accessible output end by a pair of gripping wing pieces, respectively; wherein each of said power output conductors contains a fixed contact;

wherein said fixed contact on each of said pair of power input metal pieces is capable of contacting with one of said movable contact on one of said pair of cantilevers of each of said pair of flexible power output metal pieces; and wherein said fixed contact on each of said pair of power output conductors is capable of contacting with the other movable contact on one of said pair of cantilevers of each of flexible power output metal pieces to establish or disconnect electrical continuity between said input power end and said output power end and said user accessible output ends.

* * * * *